US012443968B2

(12) United States Patent
Doumar et al.

(10) Patent No.: US 12,443,968 B2
(45) Date of Patent: Oct. 14, 2025

(54) SYSTEM AND METHODS FOR UNIVERSAL IDENTIFICATION AND PASSPORT MANAGEMENT

(71) Applicant: TapText llc, Coral Springs, FL (US)

(72) Inventors: Steve Doumar, Fort Lauderdale, FL (US); David Teodosio, Guilford, CT (US)

(73) Assignee: TAPTEXT LLC, Coral Springs, FL (US)

( * ) Notice: Subject to any disclaimer, the term of this patent is extended or adjusted under 35 U.S.C. 154(b) by 220 days.

(21) Appl. No.: 18/161,086

(22) Filed: Jan. 29, 2023

(65) Prior Publication Data

US 2023/0368233 A1 Nov. 16, 2023

Related U.S. Application Data

(63) Continuation-in-part of application No. 17/942,227, filed on Sep. 12, 2022, now Pat. No. 12,158,938, and (Continued)

(51) Int. Cl.
*H04M 1/64* (2006.01)
*G06F 16/955* (2019.01)
(Continued)

(52) U.S. Cl.
CPC ..... *G06Q 30/0207* (2013.01); *G06F 16/9554* (2019.01); *G06F 16/9558* (2019.01);
(Continued)

(58) Field of Classification Search
CPC .. G06F 16/9554; G06F 16/9558; G06F 21/32; G06F 21/6245; G06F 2221/2139;
(Continued)

(56) References Cited

U.S. PATENT DOCUMENTS 8,380,230 B2 * 2/2013 Christianson ........... H04L 67/55
455/414.1
8,620,365 B2 12/2013 Hunziker
(Continued)

FOREIGN PATENT DOCUMENTS

EP 3316549 A1 5/2018

OTHER PUBLICATIONS

Wang et al. Non-fungible token (NFT): Overview, evaluation, opportunities and challenges. arXiv preprint arXiv:2105.07447.Oct. 25, 2021. [retrieved on Jul. 3, 2023] Retrieved from the Internet < URL: https://arxiv.org/pdf/2105.07447.pdf> entire document.

*Primary Examiner* — Md S Elahee
(74) *Attorney, Agent, or Firm* — Galvin Patent Law LLC; Brian R Galvin

(57) ABSTRACT

A system and method for universal identification and passport management using a phone identifier and text redirect for user identification. The first step is engagement by a mobile phone with a call-to-action embedded in various media that triggers a text message to auto-populate on the mobile phone. The auto-populated message comprises information about the user and a unique identifier. The second step is for the user to tap to send the auto-populated message to the universal identification and passport manager, thus initiating the identification of the user. The manager works with an identity verifier and privileges handler to identify the user, grant the user access to a third-party client system, and perform other actions based on the unique identifier and stored authentication instructions.

20 Claims, 23 Drawing Sheets

Related U.S. Application Data a continuation-in-part of application No. 17/943,118, filed on Sep. 12, 2022, now Pat. No. 12,067,587, which is a continuation-in-part of application No. 17/875,402, filed on Jul. 27, 2022, now Pat. No. 11,861,640, and a continuation-in-part of application No. 17/409,841, filed on Aug. 24, 2021, now Pat. No. 11,610,193, which is a continuation-in-part of application No. 17/360,731, filed on Jun. 28, 2021, now Pat. No. 11,871,308, said application No. 17/943,118 is a continuation-in-part of application No. 17/351,321, filed on Jun. 18, 2021, now Pat. No. 11,201,965, which is a continuation of application No. 17/349,659, filed on Jun. 16, 2021, now Pat. No. 11,488,188, said application No. 17/875,402 is a continuation of application No. 17/349,659, filed on Jun. 16, 2021, now Pat. No. 11,488,188, which is a continuation of application No. 17/348,660, filed on Jun. 15, 2021, now Pat. No. 11,232,471, which is a continuation of application No. 17/344,695, filed on Jun. 10, 2021, now Pat. No. 11,354,691, which is a continuation of application No. 17/229,251, filed on Apr. 13, 2021, now abandoned, said application No. 17/360,731 is a continuation-in-part of application No. 17/229,251, filed on Apr. 13, 2021, now abandoned, which is a continuation-in-part of application No. 17/209,474, filed on Mar. 23, 2021, now Pat. No. 11,599,916, which is a continuation-in-part of application No. 17/208,059, filed on Mar. 22, 2021, now Pat. No. 11,562,407, which is a continuation-in-part of application No. 17/191,977, filed on Mar. 4, 2021, now abandoned, which is a continuation-in-part of application No. 17/190,260, filed on Mar. 2, 2021, now Pat. No. 11,532,020, which is a continuation-in-part of application No. 17/153,426, filed on Jan. 20, 2021, now abandoned, said application No. 17/360,731 is a continuation-in-part of application No. 17/085,931, filed on Oct. 30, 2020, now Pat. No. 11,055,736, which is a continuation-in-part of application No. 16/693,275, filed on Nov. 23, 2019, now Pat. No. 11,270,354.

(60) Provisional application No. 63/411,163, filed on Sep. 29, 2022, provisional application No. 63/350,415, filed on Jun. 9, 2022, provisional application No. 63/319,314, filed on Mar. 12, 2022, provisional application No. 63/211,496, filed on Jun. 16, 2021, provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,568, filed on Jan. 21, 2020, provisional application No. 62/963,379, filed on Jan. 20, 2020, provisional application No. 62/963,368, filed on Jan. 20, 2020, provisional application No. 62/940,607, filed on Nov. 26, 2019, provisional application No. 62/904,568, filed on Sep. 23, 2019, provisional application No. 62/883,360, filed on Aug. 6, 2019, provisional application No. 62/879,862, filed on Jul. 29, 2019.

(51) Int. Cl.
| | | |
|---|---|---|
| *G06F 21/32* | (2013.01) | |
| *G06F 21/62* | (2013.01) | |
| *G06K 7/14* | (2006.01) | |
| *G06K 19/06* | (2006.01) | |
| *G06N 20/00* | (2019.01) | |
| *G06Q 10/0631* | (2023.01) | |
| *G06Q 30/016* | (2023.01) | |
| *G06Q 30/0201* | (2023.01) | |
| *G06Q 30/0207* | (2023.01) | |
| *H04M 3/523* | (2006.01) | |
| *H04M 3/527* | (2006.01) | |
| *H04M 3/533* | (2006.01) | |
| *G06Q 30/0251* | (2023.01) | |

(52) U.S. Cl.
CPC .......... *G06F 21/32* (2013.01); *G06F 21/6245* (2013.01); *G06K 7/1417* (2013.01); *G06K 19/06037* (2013.01); *G06N 20/00* (2019.01); *G06Q 10/06315* (2013.01); *G06Q 30/016* (2013.01); *G06Q 30/0201* (2013.01); *H04M 3/523* (2013.01); *H04M 3/527* (2013.01); *H04M 3/53308* (2013.01); *H04M 3/53333* (2013.01); *G06F 2221/2139* (2013.01); *G06Q 30/0267* (2013.01)

(58) Field of Classification Search
CPC .......... G06K 19/06037; G06K 7/1417; G06Q 10/06315; G06Q 30/016; G06Q 30/0201; G06Q 30/0207; G06Q 30/0267; G06Q 30/0255; H04M 3/523; H04M 3/527; H04M 3/53308; H04M 3/53333; H04L 51/58; H04L 67/55
USPC ...................................................... 379/88.22
See application file for complete search history.

(56) References Cited

U.S. PATENT DOCUMENTS

| | | | |
|---|---|---|---|
| 8,783,571 | B2 | 7/2014 | Sakahashi et al. |
| 8,950,685 | B1 | 2/2015 | Lin et al. |
| 9,223,885 | B2 | 12/2015 | Marsico |
| 9,237,424 | B2 | 1/2016 | Nelkenbaum |
| 10,031,643 | B2 * | 7/2018 | Chien ................. H04L 51/58 |
| 10,361,870 | B2 | 7/2019 | Chow et al. |
| 10,645,037 | B2 | 5/2020 | Schmid et al. |
| 11,062,038 | B2 | 7/2021 | Murphy et al. |
| 11,201,737 | B1 | 12/2021 | Will et al. |
| 11,205,105 | B1 | 12/2021 | Devlin et al. |
| 11,210,648 | B2 | 12/2021 | Ortiz et al. |
| 11,368,454 | B2 | 6/2022 | Whaley et al. |
| 2010/0094703 | A1 * | 4/2010 | Bramley ............ G06Q 30/0255 715/823 |
| 2012/0226743 | A1 | 9/2012 | Smargon |
| 2012/0278142 | A1 | 11/2012 | Li |
| 2013/0144738 | A1 | 6/2013 | Qawami et al. |
| 2015/0039409 | A1 | 2/2015 | Marsico et al. |
| 2017/0214522 | A1 | 7/2017 | Code et al. |
| 2017/0244555 | A1 | 8/2017 | Beiter et al. |
| 2018/0060914 | A1 | 3/2018 | Conrad et al. |
| 2019/0354665 | A1 | 11/2019 | Haslam et al. |
| 2020/0045020 | A1 | 2/2020 | Soundararajan et al. |
| 2020/0184085 | A1 | 6/2020 | Korten et al. |
| 2020/0186338 | A1 | 6/2020 | Andon et al. |
| 2020/0242105 | A1 | 7/2020 | Rich et al. |
| 2021/0092135 | A1 | 3/2021 | Strogov et al. |
| 2021/0256070 | A1 | 8/2021 | Tran et al. |
| 2021/0306460 | A1 | 9/2021 | Doumar et al. |
| 2021/0319116 | A1 | 10/2021 | Jarvis |
| 2021/0398095 | A1 | 12/2021 | Mallett et al. |
| 2022/0201476 | A1 | 6/2022 | Naujok et al. |

(56) References Cited

U.S. PATENT DOCUMENTS

2022/0201477 A1 6/2022 Rolfe
2022/0311611 A1 9/2022 Gaur et al.

* cited by examiner

SYSTEM AND METHODS FOR UNIVERSAL IDENTIFICATION AND PASSPORT MANAGEMENT

CROSS-REFERENCE TO RELATED APPLICATIONS

Priority is claimed in the application data sheet to the following patents or patent applications, each of which is expressly incorporated herein by reference in its entirety:
63/411,163
U.S. Ser. No. 17/942,227
63/319,314
U.S. Ser. No. 17/943,118
U.S. Ser. No. 17/875,402
U.S. Ser. No. 17/349,659
U.S. Ser. No. 17/348,660
U.S. Ser. No. 17/344,695
U.S. Ser. No. 17/229,251
63/166,391
U.S. Ser. No. 17/209,474
U.S. Ser. No. 17/208,059
U.S. Ser. No. 17/191,977
U.S. Ser. No. 17/190,260
U.S. Ser. No. 17/153,426
62,965,626
62/963,368
62/963,379
63/040,610
63/025,287
63/022,190
62/994,219
63/154,357
63/350,415
U.S. Ser. No. 17/409,841
U.S. Ser. No. 17/360,731
U.S. Ser. No. 17/085,931
62/963,568
62/940,607
U.S. Ser. No. 16/693,275
62/904,568
62/879,862
63/211,496
U.S. Ser. No. 17/351,321

BACKGROUND

Field of the Art

The disclosure relates to the field of computer-based communication systems, and more particularly to the field of user identification and privilege management.

Discussion of the State of the Art

In today's digital world, user identification is complicated and insecure. Typically, users input credentials and may be further required to provide additional verification. Even with multi-factor authentication, user credentials are susceptible to being stolen or circumvented: passwords, pass codes, biometric data, security questions and answers, etc. Data breaches exposed 22 billion records in 2021 alone. To limit the impact of such breaches, many users maintain separate credentials across accounts. This approach increases the difficulty and time required to verify their identity and maintain the credential portfolio over time. Varying password requirements and multi-factor authentication integration contributes to hassle for users.

Along the same lines, identifying users and granting privileges suffer from security and complexity issues. Solutions improving identification accuracy typically trade ease and speed, resulting in losses in performance and output. Other solutions increase the risk of downtime or lead to heightened bounce rates or user attrition.

What is needed is a system and method for identifying users using their mobile phone and a text redirect.

SUMMARY

Accordingly, the inventor has conceived, and reduced to practice, a system and method for universal identification and passport management using a phone identifier and text redirect. The first step is engagement by a mobile phone with a call-to-action embedded in various media that triggers a text message to auto-populate on the mobile phone. The auto-populated message comprises information about the user and a unique identifier. The second step is for the user to tap to send the auto-populated message to the universal identification and passport manager, thus initiating the identification of the user. The manager works with an identity verifier and privileges handler to grant the user access and perform other actions based on the unique identifier and stored authentication instructions. Successful authentication is sent to the client and may also be sent to the user via SMS or MMS.

According to a preferred embodiment, a system for universal identification and passport management, comprising: a computing device comprising a memory, a processor, and a non-volatile data storage device; a first database stored on the non-volatile data storage device, the first database comprising a plurality of user data, wherein the plurality of user data includes a plurality of user privileges data and a plurality of user identity profiles comprising a plurality of user data, wherein the plurality of user data includes at least each user's phone number and device international mobile equipment identity (IMEI); a second database stored on the non-volatile data storage device, the second database comprising a plurality of client instructions for authenticating a user computing device on a third-party client system, each client instruction of the plurality of client instructions comprising a scheme for generating placement of call-to-action elements and a verification procedure; a positioning manager comprising a first plurality of programming instructions stored in the memory which, when operating on the processor, causes the computing device to: retrieve from the second database a client instruction for authenticating a user computing device; generate a call-to-action element comprising coding instructions configured to generate a pre-filled short message service (SMS) or multi-media message service (MMS) message comprising a destination, an identifier, and an IMEI on user computing devices, such that interaction with the call-to-action element on a user computing device causes the user computing device to propagate the pre-filled SMS or MMS message; place the call-to-action element according to the scheme specified in the client instructions; an identification and passport manager comprising a second plurality of programming instructions stored in the memory which, when operating on the processor, causes the computing device to: receive the SMS or MMS message from the user computing device via the destination; capture a phone number from which the SMS or MMS message was sent; retrieve from the second database a client instruction for authenticating the user computing device using the identifier; execute the client instruction, wherein the client instruction causes the computing device to: query the first database using the phone number and IMEI of the user computing device; verify, using the query results, that a user identity profile associated with the phone number and IMEI satisfies the verification procedure of the client instruction; and send a notification to the third-party client system, is disclosed.

According to another preferred embodiment, a method for universal identification and passport management, comprising the steps of: creating a first database on the non-volatile data storage device of a computing device, the computing device comprising a memory, a processor, and the non-volatile data storage device, the first database comprising a plurality of user data, wherein the plurality of user data includes a plurality of user privileges data and a plurality of user identity profiles comprising a plurality of user data, wherein the plurality of user data includes at least each user's phone number and device international mobile equipment identity (IMEI); creating a second database on the non-volatile data storage device of a computing device, the computing device comprising a memory, a processor, and the non-volatile data storage device, the second database comprising a plurality of client instructions for authenticating a user computing device on a third-party client system, each client instruction of the plurality of client instructions comprising a scheme for generating placement of call-to-action elements and a verification procedure; using a positioning manager operating on the computing device to perform the steps of: retrieving from the second database a client instruction for authenticating a user computing device; generating a call-to-action element comprising coding instructions configured to generate a pre-filled short message service (SMS) or multi-media message service (MMS) message comprising a destination, an identifier, and an IMEI on user computing devices, such that interaction with the call-to-action element on a user computing device causes the user computing device to propagate the pre-filled SMS or MMS message; placing the call-to-action element according to the scheme specified in the client instructions; using an identification and passport manager operating on the computing device to perform the steps of: retrieving from the second database a client instruction for authenticating a user computing device; receiving the SMS or MMS message from the user computing device via the destination; capturing a phone number from which the SMS or MMS message was sent; retrieving from the second database a client instruction for authenticating the user computing device using the identifier; executing the client instruction, wherein the client instruction causes the computing device to: querying the first database using the phone number and IMEI of the user computing device; verifying, using the query results, that a user identity profile associated with the phone number and IMEI satisfies the verification procedure of the client instruction; and sending a notification to the third-party client system, is disclosed.

BRIEF DESCRIPTION OF THE DRAWINGS

The accompanying drawings illustrate several aspects and, together with the description, serve to explain the principles of the disclosed embodiments. It will be appreciated by one skilled in the art that the particular arrangements illustrated in the drawings are merely exemplary, and are not to be considered as limiting of the scope of the claims herein in any way.

DETAILED DESCRIPTION

Figure 1:
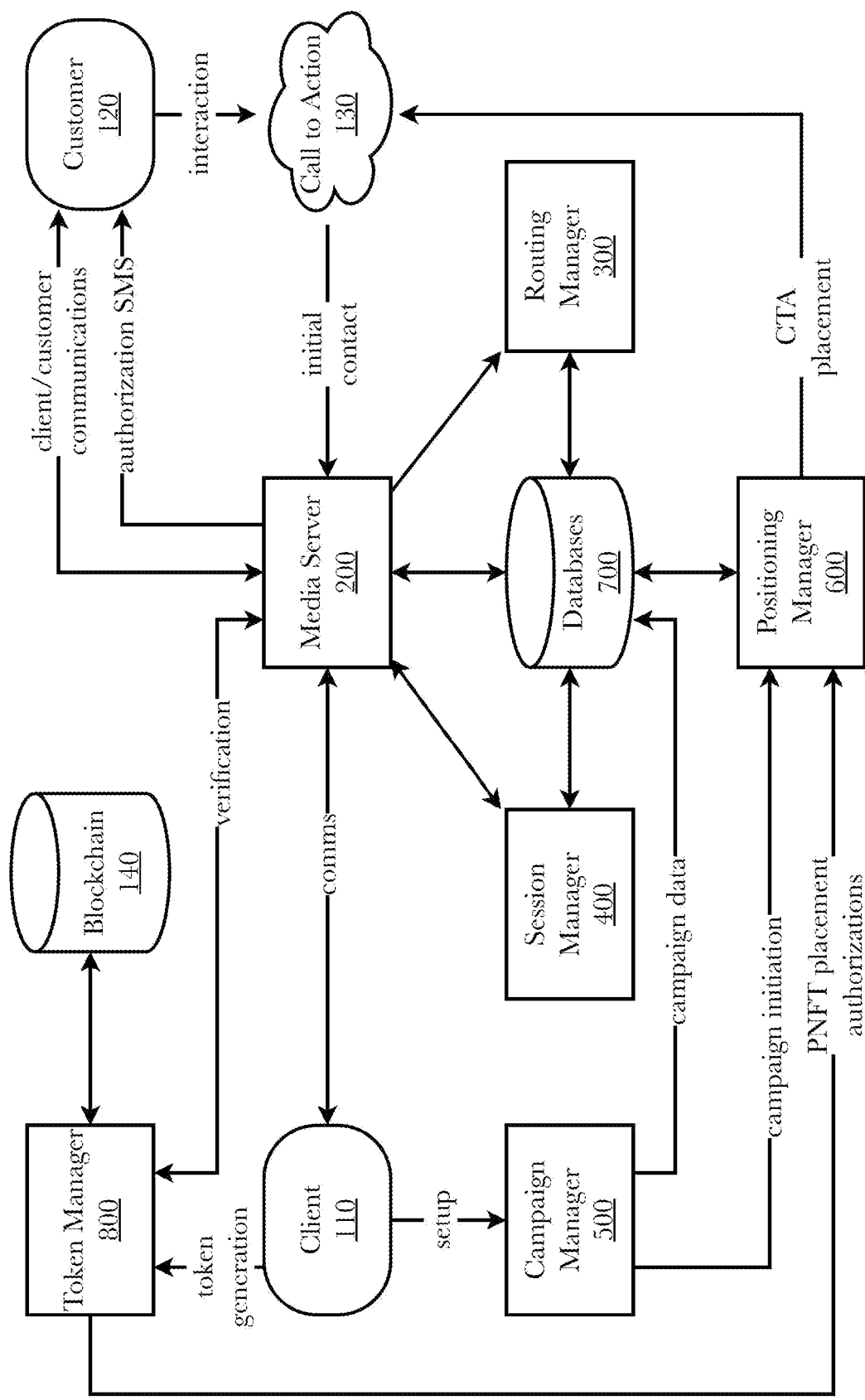
FIG. 1 is an exemplary system architecture for a communications and interaction system using SMS-based authorizations and personal non-fungible tokens.

The inventor has conceived and reduced to practiced, a system and method for universal identification and passport management using a phone identifier and text redirect for user identification. The first step is engagement by a mobile phone with a call-to-action embedded in various media that triggers a text message to auto-populate on the mobile phone. The auto-populated message comprises information about the user and a unique identifier. The second step is for the user to tap to send the auto-populated message to the universal identification and passport manager, thus initiating the identification of the user. The manager works with an identity verifier and privileges handler to grant the user access and perform other actions based on the unique identifier and stored authentication instructions. Successful authentication is sent to the client and may also be sent to the user via SMS or MMS.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in said arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is an exemplary system architecture for a communications and interaction system using SMS-based authorizations and personal non-fungible tokens. In this exemplary embodiment, the system comprises a media server 200, a routing manager 300, a session manager 400, a campaign manager 500, a positioning manager 600, databases 700, and a token manager 800. The system facilitates communications and interactions between clients 110 and customers 120 using calls to action 130. A client 110 is any person or entity (e.g., a business entity) wishing to engage in communications or interactions and who has established a marketing campaign or established a personal non-fungible token (PNFT) for that purpose. A customer 120 is any person or entity (e.g., a business entity) wishing to engage in communications or interactions with a client 110. Communications and interactions between clients 110 and customers 120 are initiated by a customer's interaction with a call to action (CTA) 130. The CTA 130 is any means for contacting a client 110 through the system comprising a way to identify the CTA 130 and the client with which it is associated. For online and other digital CTAs (websites, emails, in-app advertisements, etc.), the CTA 130 will generally be generated and placed by the system in accordance with a client's 110 marketing campaign rules or PNFT rules. However, non-electronic CTAs are also possible such as printed CTAs in print advertising, signage, or in-store displays.

The media server 200 acts as the communication channel interface between client and customer devices, passing various forms of communications media (emails, texts, traditional telephone, VOIP, etc.) between the devices. The routing manager 300 selects an appropriate routing for incoming and outgoing communications based on information from the session manager. The session manager 400 creates and manages each communication session between a client and customer by creating a session initiation protocol (SIP) communication sessions for each communication between a client and customer using the CTA identifier, the customer's contact information, and information about the communications medium being used. The session manager 400 monitors and logs the session and terminates the session when the communication ends. The campaign manager 500 provides the client with an interface through which the client may create automated advertising campaigns which may be dynamically adjusted based on feedback from customer interactions with CTAs and other information. The positioning manager 600 creates campaign instances from a campaign, and automatically determines where and when to place CTAs for each campaign instance depending on scheduling, targeting, and budgeting goals. The databases 700 store campaign information, client information, and customer information. The token manager 800 provides an interface for design and generation of PNFTs, establishment of automation rules for interactions with PNFTS, and verification of identities using PNFTs.

Figure 2:
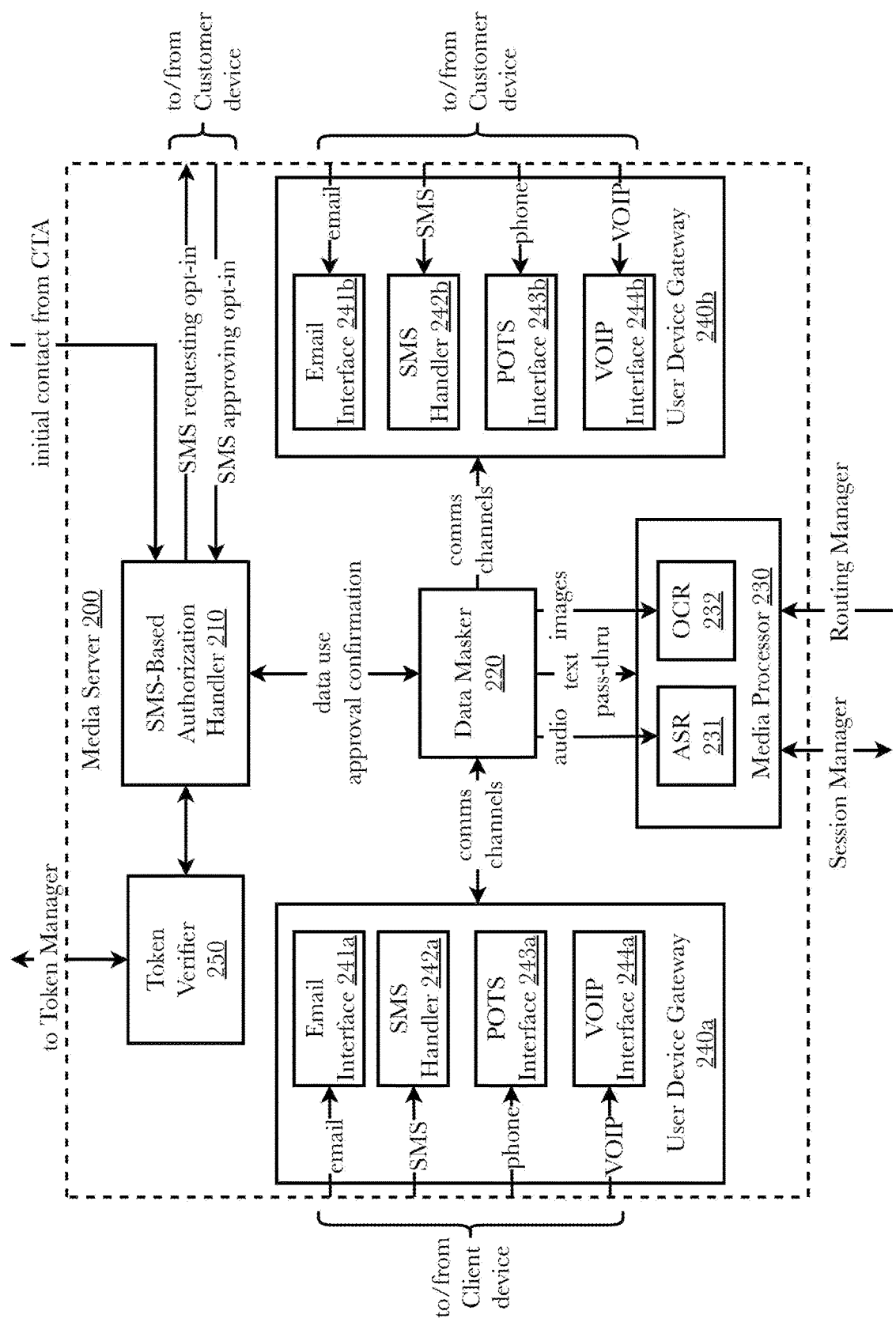
FIG. 2 is an exemplary media server aspect of a communications and interaction system using SMS-based authorizations and personal non-fungible tokens.

FIG. 2 is an exemplary media server aspect of a communications and interaction system using SMS-based authorizations and personal non-fungible tokens. The media server 200 acts as the communication channel interface between client and customer devices, passing various forms of communications media (emails, texts, traditional telephone, VOIP, etc.) between the devices. In this embodiment, the media server comprises an SMS-based authorization handler 210, a data masker 220, a media processor 230, user device gateways 240*a,b*, on both the client and customer sides, and a token verifier 250.

In this embodiment, an SMS-based authorization handler 210 is shown as part of the media server 200. The SMS-based authorization handler 210 handles the data use authorization (also called an "opt-in") process via text messages. Using the SMS-based authorization handler 210, the system is configured to facilitate interactions by utilizing a short message service (SMS) authorization methodology wherein interaction with a CTA on a smartphone initiates a series of SMS messages back and forth to the media server 200 which authorizes communications between the user of a smartphone (a customer) and a third party associated with the CTA (a client). When the customer interacts with the CTA on his or her smartphone, the CTA accesses the smartphone's text messaging application and causes the smartphone to generate a first SMS on the smartphone which has been pre-filled with an SMS address code for the SMS-based authorization handler 210 of the media server 200 and a CTA identifier. When the first SMS is sent from the smartphone, the SMS-based authorization handler 210 of the media server 200 receives the first SMS, captures the CTA identifier and phone number of the smartphone, and sends a second SMS back to the smartphone containing a link and a request for authorization to send the phone number to a third party for communications (e.g., "To authorize Company X to call you back on phone number Y to purchase product Z, click here."). Clicking on the link in the second SMS sends a third SMS back to the SMS-based authorization handler 210 of the media server 200 authorizing the transmission of the phone number to a client so that the client may contact the customer. In this way, authorization for capture of the customer's phone number and establishment of communications with a client can be established simply by having the customer click on two automatically-generated SMS messages without having to otherwise enter any data on the smartphone. This method works universally on all smartphones with SMS technology without having to install additional applications. The data use approval confirmation received by the customer is logged and passed to other components of the system (e.g., to the session manager via the data masker) to confirm authorization to use private information. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

A data masker 220 operating on the media server 200 preserves the privacy of both client and customer by masking the phone number, email addresses, and other identifying information of the parties until they voluntarily exchange confidential information between themselves via the communications medium. As the data masker 220 is privy to the private information of the parties, it can establish a connection with each party separately using the private information, and they join the parties together via a real-time communications medium (e.g., phone) without having to pass the private information to each of the parties or can forward non-real-time communications between the parties (e.g., emails) while stripping identifying information from the transmitted messages (e.g., from the email headers).

The media processor 230 converts audio and image communications media to text, and passes through text communications to the session manager 400. For example, where the interaction with the CTA is in audio form (e.g., a call to a phone number printed on the CTA), the audio from the interaction may be sent to an automated speech recognition (ASR) processor 231 (also known as a speech-to-text (STT) processor) to convert the speech from the audio into text. Where the interaction with the CTA is a transmitted image (e.g., a photo of the CTA sent by MMS), the image from the interaction may be sent to an optical character recognition (OCR) processor 232 to extract any text in the image (e.g., the CTA identifier). The converted text is then sent to the NLP engine to be processed as with the interactions in text form. Any text interactions with the CTA (e.g., text messages), are passed through to the session manager 400.

User device gateways 240*a*, 240*b* on both the client side and customer side both comprise a plurality of interfaces 241*a*-244*a*, 241B-244*b* receive and transmit communications to and from client and customer devices. For simplicity and clarity, a single user device gateway is shown on the client end 240*a* and on the customer end 240*b*, each comprising an email interface 241*a,b*, a short message service (SMS) handler 242*a,b*, a plain old telephone (POTS, or traditional telephone line) interface 243*a,b*, and a voiceover-Internet-protocol (VOIP) interface 244a,b. While these are the most common media interfaces, the user device gateways 240a,b may have other such communications media interfaces and there may be a plurality of user device gateways 240a,b on either side.

Figure 3:
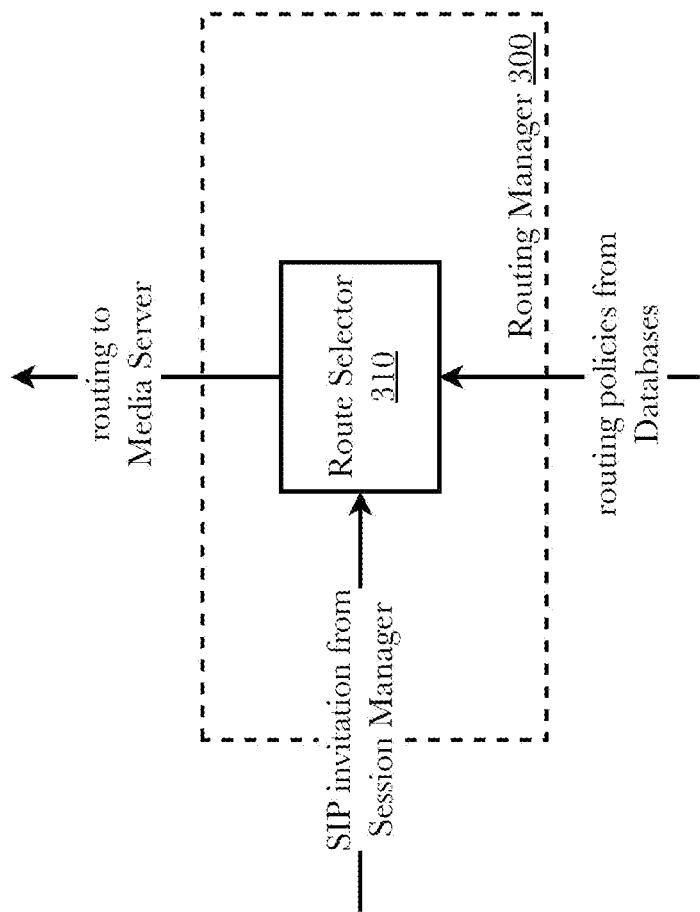
FIG. 3 is an exemplary routing manager aspect of a communications and interaction system using SMS-based authorizations and personal non-fungible tokens.

FIG. 3 is an exemplary routing manager aspect of a communications and interaction system using SMS-based authorizations and personal non-fungible tokens. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

The routing manager 300 selects an appropriate routing for incoming and outgoing communications based on information from the session manager. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

Figure 4:
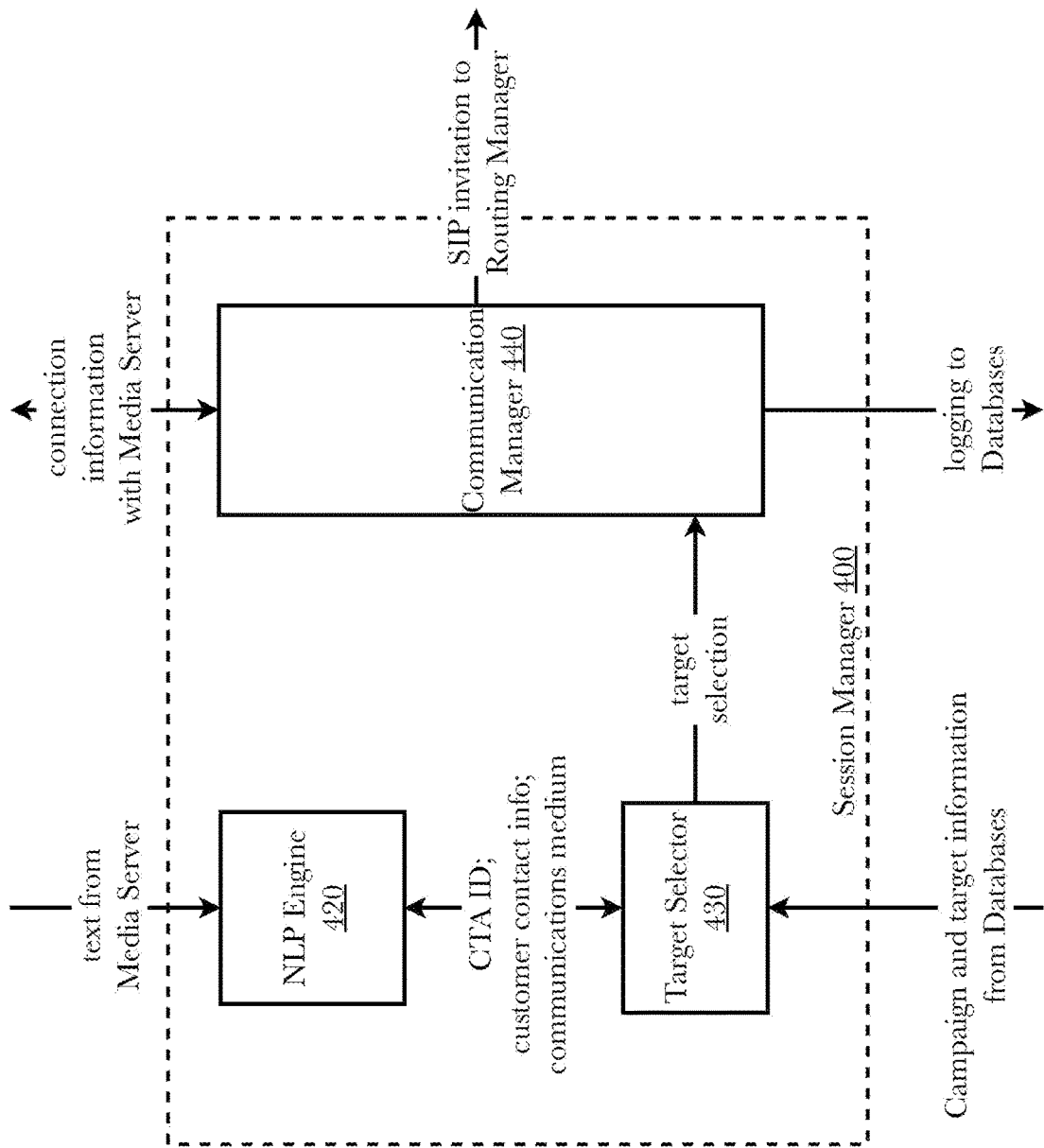
FIG. 4 is an exemplary session manager aspect of a communications and interaction system using SMS-based authorizations and personal non-fungible tokens.

FIG. 4 is an exemplary session manager aspect of a communications and interaction system using SMS-based authorizations and personal non-fungible tokens. The session manager 400 creates and manages each communication session between a client and customer. The session manager 400 creates session initiation protocol (SIP) communication sessions for each communication between a client and customer using the CTA identifier, the customer's contact information, and information about the communications medium being used. The session manager 400 monitors and logs the session, and terminates the session when the communication ends. In this embodiment, the session manager comprises a natural language processing (NLP) engine 420, a target selector 430, and a communication manager 440.

Where a customer has interacted with a CTA, an identifier for the CTA is obtained from one of a variety of methods (e.g., an identifier embedded in a link, a call to certain phone numbers designated to handle CTAs of a certain type, a CTA identifier in a text message from the customer, etc.). In this embodiment, where the interaction with the CTA is in text form (e.g., clicking on a website link CTA generates a pre-populated SMS containing the CTA identifier on the customer's mobile device which is sent to the media server), the text from the interaction with the CTA is sent to a natural language processing engine 420 which parses the text to extract the CTA ID, and possible other contextual information (such as the terms "lease" or "buy," which may determine to which department a lead is sent), along with the customer contact information (in this example, the phone number of the customer's mobile device from which the SMS was sent) and the communications medium (in this case, a return phone call to the phone number of the customer in response to the SMS).

Thus, the connection information initially comprises a communications medium (e.g., mobile phone service), the customer's contact information for that communications medium (e.g., a phone number), and an identifier for the CTA (e.g., a CTA identification number or string). Using the CTA identifier, the campaign and target information associated with the CTA identifier are retrieved from a campaign database for the relevant client, and a target selector 430 selects an appropriate client target to receive the communication depending on the connection information (e.g., a salesperson X in department Y at company Z who specializes in the type of product advertised by the CTA). After the target is selected, a communications manager 440 of the session manager 400 initiates a session initiation protocol (SIP) session by issuing an SIP invitation to the routing manager 300. After creation of the session, the communication manager 440 monitors and logs the session, and terminates the session when the communication ends.

Should the initially-selected target not be available, the target selector 430 may initiate a routing script that queries the databases 700 to determine next target resource. This process may be repeated until all potential targets of the client in the campaign are exhausted (i.e. no client resource is available to accept the call for that CTA). In that event, the voice call may be routed to a voicemail system corresponding to one of the client's resources or a general voicemail box. A notification of the failed attempt to connect with a live client resource may be sent to the client.

Figure 5:
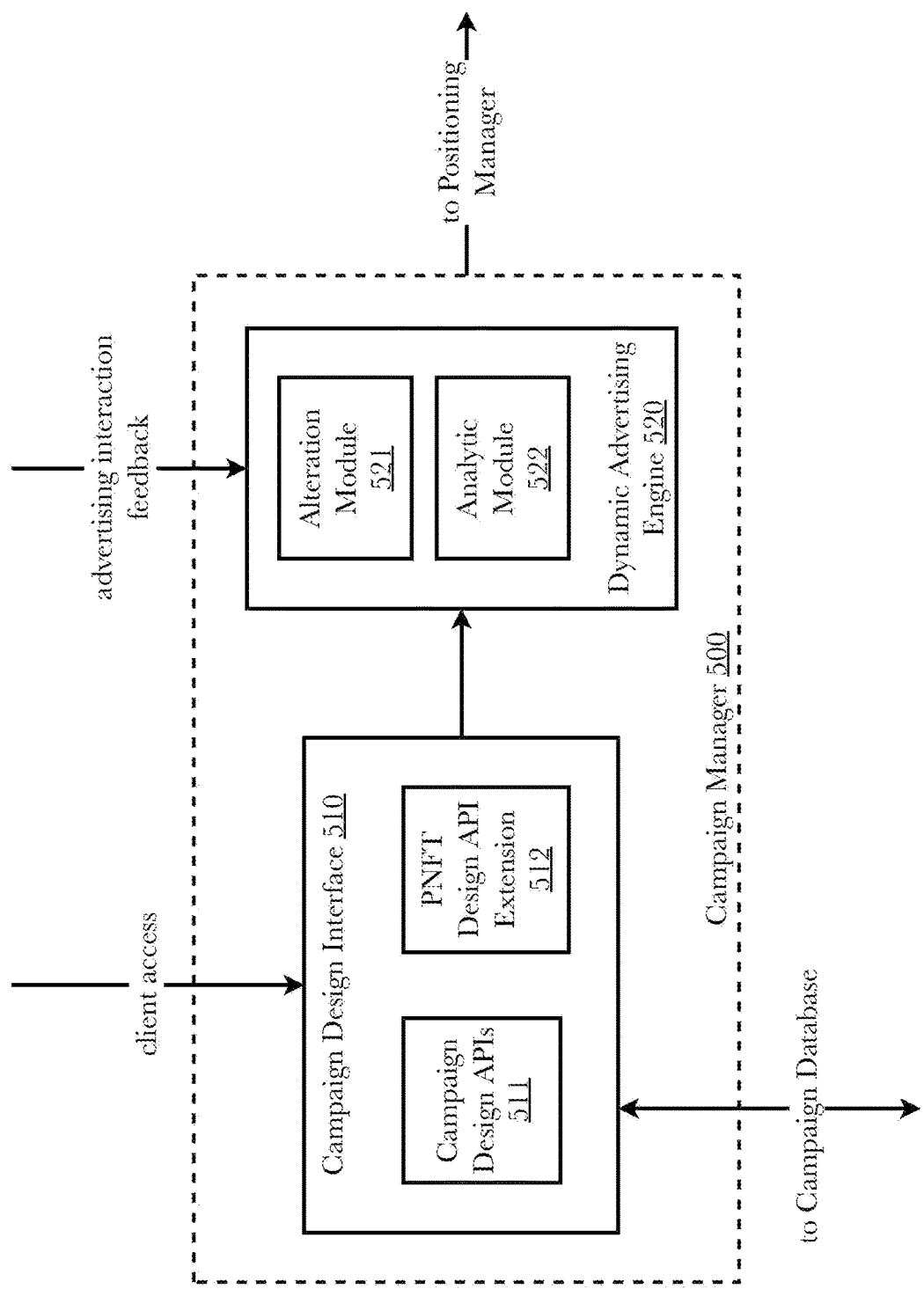
FIG. 5 is an exemplary campaign manager aspect of a communications and interaction system using SMS-based authorizations and personal non-fungible tokens.

FIG. 5 is an exemplary campaign manager aspect of a communications and interaction system using SMS-based authorizations and personal non-fungible tokens. The campaign manager 500 provides the client with an interface through which the client may create automated advertising campaigns which may be dynamically adjusted based on feedback from customer interactions with CTAs and other information. In this embodiment, the campaign manager comprises a campaign design interface 510 and a dynamic advertising engine 520.

The campaign design interface 510 comprises one or more campaign design APIs 511 which allow clients to set up campaigns comprising products and services, target audiences, rules, schedules, budgets, and the like. Each campaign design API 511 provides one or more aspects of the interface such as a graphical interface, rule creation tools, budgeting tools, target audience selection tools, etc., and the collection of the campaign design APIs 511 allows the client to define complete marketing campaigns, which are stored in the campaign database of the databases 700. If PNFTs are used, the PNFT design API extension 512 allows access to a similar PNFT design interface in the token manager 800 for creation and implementation of PNFTs.

Once a marketing campaign is created and implemented, the dynamic advertising engine 520 can be configured to make automatic changes to the campaign (or an aspect of a campaign) based on feedback from interaction with CTAs and other information such as product or service sales numbers. In some embodiments, ad variants may be generated by dynamic advertisement engine 520. In some embodiments, ad variants may be generated semi-autonomously with input from business personnel. For example, dynamic advertisement engine 520 may receive data associated with an ad campaign and analyze it, and based on the analytic data it may suggest an element of an advertisement to be altered, which can then be reviewed and implemented by a client representative such as a business marketing manager. In some embodiments, ad variants may be generated autonomously. For example, dynamic advertisement engine 520 may receive analytic data associated with an ad campaign and based on the received data it may suggest an element of an advertisement to be altered, which can be automatically applied to the ad via the ad campaign data stored in campaign database 730.

A purpose of utilizing ad variants is to gather useful data about the efficacy, efficiency, and profitability of a given advertisement and/or an ad campaign. Implementing two similar ads with the only difference between the two being a single element alteration (i.e., A/B testing) can allow businesses to understand how elemental choices for an advertisement affect customer interaction. For example, an ad campaign for a hiking boot may be developed with the tagline "Reach New Heights With These Boots," and a variant ad may be developed the tagline "Tough On The Mountain, Gentle On Your Feet," wherein the only difference between both ads is the tagline. Both the baseline ad and the variant ad can then be deployed and customer engagement data with both the baseline and variant can be monitored and analyzed to determine which of the baseline or the variant led to better outcomes for the business running the ads and/or ad campaign. In some embodiments, ad campaign data may include a test plan for configuring the deployment of two variant advertisements. For example, a test plan may describe what element is to be tested and subsequently altered, the goals of the test plan (e.g., improving conversion rates), initial state of advertisement (i.e., baseline metric that describes current state of advertisement), the order of element alterations to be made, test design (e.g., how long to test the variants, which devices to test on, etc.) and the like. In some embodiments, test plans may be received, retrieved, or otherwise obtained from campaign database 730 by dynamic advertisement engine 520 as an input into suggesting element alterations.

According to some embodiments, the analytic module 522 may receive, retrieve, or otherwise obtain a plurality of data such as, but not limited to, details of interactions with CTAs, media stream data, ad campaign data, survey data, and business data, and may process the plurality of data in order to determine the efficacy of a given advertisement and/or ad campaign. In some embodiments, analytic module 522 may receive data pertaining to at least two advertisements comprising a baseline advertisement and a variant advertisement, and determine which of the two advertisements produced better results based upon analysis of the received data.

According to some embodiments, analytical data such as, for example, a determination of a better advertisement between at least two advertisements, may be received, retrieved, or otherwise obtained by dynamic advertisement engine 520. Dynamic advertisement engine 520 and/or alteration module 521 may process the analytical data together with ad campaign data (e.g., test plan information) in order to suggest at least one advertisement element to alter in order to form a new variant of an advertisement. For example, data analytics suggest that a first variant of a baseline advertisement was better at leading to product sales than the baseline version of the advertisement, and responsive to this analysis alteration module 521 can suggest an element alteration to the first variant to form a second variant. The first and second advertisement variants may then be deployed to various platforms via position manager 600 and the process of collecting data related to advertisement engagement/interaction can begin again using the first and second variant, wherein after statistically relevant data is collected, analytic module 522 may make a determination of whether the first variant or the second variant was better. The determination of a "better" advertisement can be based on statistically significant metrics such as, for example, ad clicks and conversion rates. In the case that the differences between two advertisements are statistically insignificant, dynamic advertisement engine 520 may suggest no alterations to an element. In some embodiments, the element to be altered is the same type of element (e.g., the tagline is altered between two advertisements).

In some embodiments, dynamic advertisement engine 520 may receive, retrieve, or otherwise obtain third party data to be used as an input when making element alteration suggestions. Because marketing is such a vital component of any business within any industry, there is a lot of market research data available regarding advertisement content and configuration which may be used by dynamic advertisement engine 520 to determine appropriate and effective element alterations. For example, studies have shown that an advertisement with a red call-to-action button outperforms a green call-to-action button by about 21%. The large difference in click rate between such a minor change shows the importance of testing different variants of a given advertisement in order to maximize customer engagement and improve conversion rates.

Figure 6:
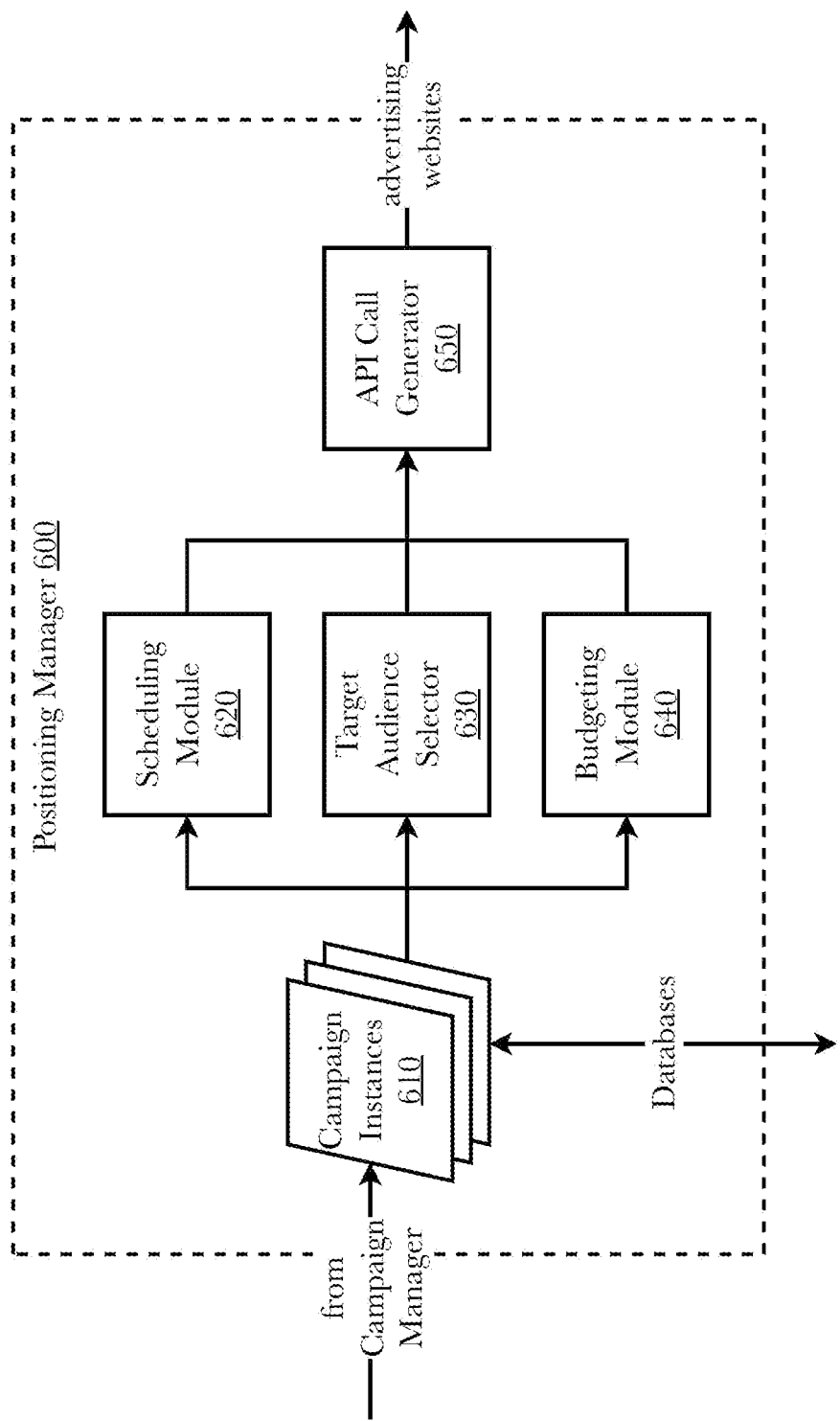
FIG. 6 is an exemplary positioning manager aspect of a communications and interaction system using SMS-based authorizations and personal non-fungible tokens.

FIG. 6 is an exemplary positioning manager aspect of a communications and interaction system using SMS-based authorizations and personal non-fungible tokens. In this embodiment, the positioning manager 600 creates campaign instances from a campaign, and automatically determines where and when to place CTAs for each campaign instance depending on scheduling, targeting, and budgeting goals.

The positioning manager 600 receives notification of the initiation of a campaign from the campaign manager, retrieves relevant information about the campaign from the databases 700, and creates one or more campaign instances 610 for implementation of the campaign. Not all campaigns will have multiple instances. Depending on the campaign configuration, each campaign instance will represent some portion or division of the campaign for implementation. For example, in a campaign by a dealership for automobile sales, instances may be generated for different types of cars which will be marketed to different target audiences. Campaign instances 610 will typically have rules associated scheduling, target audiences, and budgets. In this embodiment, each instance will is analyzed by a scheduling module 620 to identify scheduling rules and constraints and output an advertisement schedule, a target audience selector 630 to identify relevant target audiences and output a target audience selection, and a budgeting module 640 to track budgeting expenditures for the instance and output a remaining budget amount for advertising of the instance. The outputs of the scheduling module 620, target audience selector 630, and a budgeting module 640 are send to an API call generator 650, which generates an appropriate API call to a third party advertiser in accordance with the third party advertiser's ad placement API (as one example, the Google Ads API has more than 200 parameters that can be set to determine where and when an ad should be placed on its platform).

Figure 7:
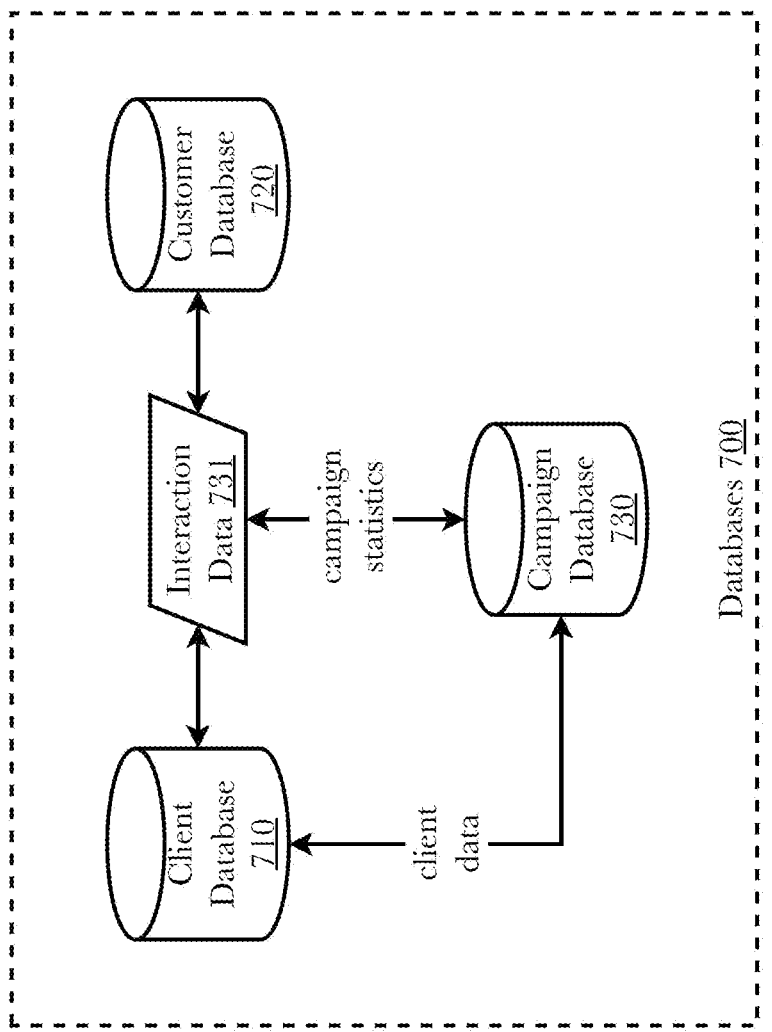
FIG. 7 is an exemplary set of databases for a communications and interaction system using SMS-based authorizations and personal non-fungible tokens.

FIG. 7 is an exemplary set of databases for a communications and interaction system using SMS-based authorizations and personal non-fungible tokens. The databases 700 store campaign information, client information, and customer information.

The client database 710 comprises information about the client for facilitating communications between clients and customers such as client contact information; target information for the client such as subsidiaries, office locations, departments, units, agents, sales representatives, and employees; logs of interactions with customers; records of the products, services, and campaigns associated with certain customers; and lists of campaigns associated with the client.

The customer database 710 comprises information about the client for facilitating communications between clients and customers such as customer contact information, logs of CTAs with which the customer has interacted, records of the products, services, and campaigns associated with CTAs with which the customer has interacted, customer purchase history, customer preferred contact method (e.g. mobile phone, e-mail), customer preferred contact times, and customer previous interaction history.

The campaign database 730 may take the form of a managed or unmanaged database, document-oriented database system, or SQL database, or other suitable form of database. Examples of types of database software that may operate include MYSQL™, ORACLE DATABASE™, MONGODB™, and others. The campaign database 730 may exist as a distinct physical device or be operating on another computing device that may perform other functions aside from operating, hosting and serving the campaign database 730. If the campaign database 730 is a distinct physical device, the database may be connected over a LAN or WAN, the Internet, a direct physical connection to another device, or some other network connection. The campaign database 730 may be a centralized database system. The campaign database 730 may be a distributed database system.

The campaign database 730 may be configured to store a plurality of ad campaigns including the associated ad campaign data for each ad campaign in the ad campaign database 730. In some embodiments, the ad campaign data specifies the different media platforms that will be used to broadcast the ad campaign. In some embodiments, ad campaign data may include one or more variants of an advertisement. In some embodiments, an advertisement variant may be an advertisement where at least one element of the advertisement has been altered in some form. Non-limiting examples of advertisement elements include: headlines and copywriting; call to actions (CTAs); images, audio, and video; subject lines (e.g., email ads); content depth (i.e., how much information to include in ad); product descriptions (e.g., length, placement, etc.); social proof (e.g., customer/purchaser reviews of product); media mentions; and landing pages. In some embodiments, elements may further include font, colors, ad placement, time and location (e.g., when and where is ad displayed), and audience.

Interaction data 731 may be generated from any interactions between clients and customers and may be stored in any of the three databases 710-730, as necessary.

Figure 8:
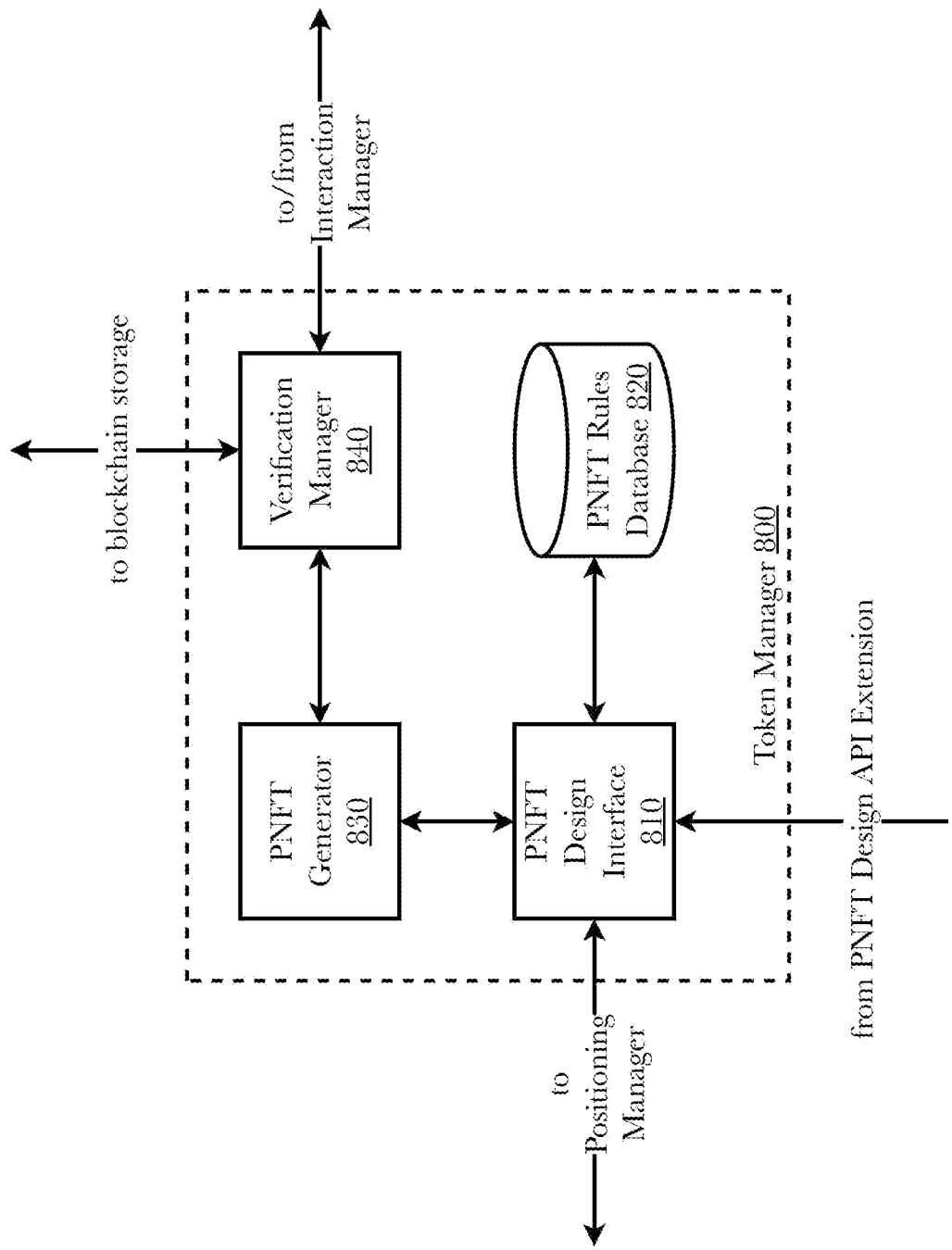
FIG. 8 is an exemplary token manager aspect of a communications and interaction system using SMS-based authorizations and personal non-fungible tokens.

FIG. 8 is an exemplary token manager aspect of a communications and interaction system using SMS-based authorizations and personal non-fungible tokens. The token manager 800 provides an interface for design and generation of PNFTs, establishment of automation rules for interactions with PNFTS, and verification of identities using PNFTs. In this embodiment, the token manager comprises a PNFT design interface 810, a PNFT rules database 820, a PNFT generator 830, and a verification manager 840.

The PNFT design interface 810 may be accessed directly or may be accessed via the PNFT design API extension 512 of the campaign manager 500. The PNFT design interface allows to set up personal non-fungible tokens (PNFTs) as universal, secure identities for online communications, interactions, and exchanges wherein each PNFT uniquely associates an image, sound, or other digital asset with a person's identity using a non-fungible token (NFT). An image, sound, or other digital asset is stored on a blockchain as an NFT, which uniquely and immutably associates the digital asset with the account owning that digital asset, thereby establishing a unique, secure personal identifier (a "personal non-fungible token" or PNFT) of the person owning that account for online communications and interactions. Links to the PNFT (also sometimes herein called "calls to action" or CTAs similarly those associated with marketing campaigns) can be customized via an online platform such that interaction with a given link or type of link initiates automated actions. Further, the online platform can be configured to automatically place the customized links to the PNFT in locations which will facilitate communications and interactions with the owner of the PNFT such as on websites, in communications such as emails and short message service (SMS) communications, and in advertisements and marketing messages.

Similarly to the campaign design APIs 511 of the campaign manager, the PNFT design interface 810 may comprise a graphical interface, rule creation tools, budgeting tools, target audience selection tools, etc., allowing the client to design automated rule sets for individual PNFT CTAs, groups of PNFT CTAs, or types of PNFT CTAs, whereby customer interactions with a given CTA will initiate certain automated actions such as requesting contact with the client, requesting authorization from the client, production of information to the client, or establishment of communications with the client. The CTAs associated with PNFTs operate similarly to CTAs associated with marketing campaigns, but are secure identifiers for a person or entity, and are not necessarily associated with marketing activity. For example, a CTA for a PNFT on a website may contain a company's trademarked logo. Interaction with the CTA provides automatic verification to the person interacting with the CTA that the website is, in fact, owned by the owner of the CTA. Thus, although CTAs for PNFTs can be used for marketing, they function primarily as secure personal identifiers and means for personal interaction with the owner of the PNFT (which can also be a business). The rules for automation of CTAs for PNFTs are stored in a PNFT rules database 820. A PNFT generator 830 generates PNFTs for each client and sends each generated PNFT to a verification manager 840 for verification of the uniqueness of the PNFT (i.e., that there is no duplicate of that particular PNFT for that particular client) and storage of the PNFT as an immutable entry on a blockchain. Because blockchains are immutable and all records of a blockchain are permanently stored on the blockchain, this ensures that each PNFT will be unique. The verification manager 840 also serves to verify the identity of the owner of a given PNFT by verifying the PNFT's identifier on the blockchain. Note that while each PNFT is unique, it is possible for the same person or entity to have more than one PNFT (e.g., the person may have a personal PNFT and also be the owner of multiple businesses, each with its own PNFT).

Figure 9:
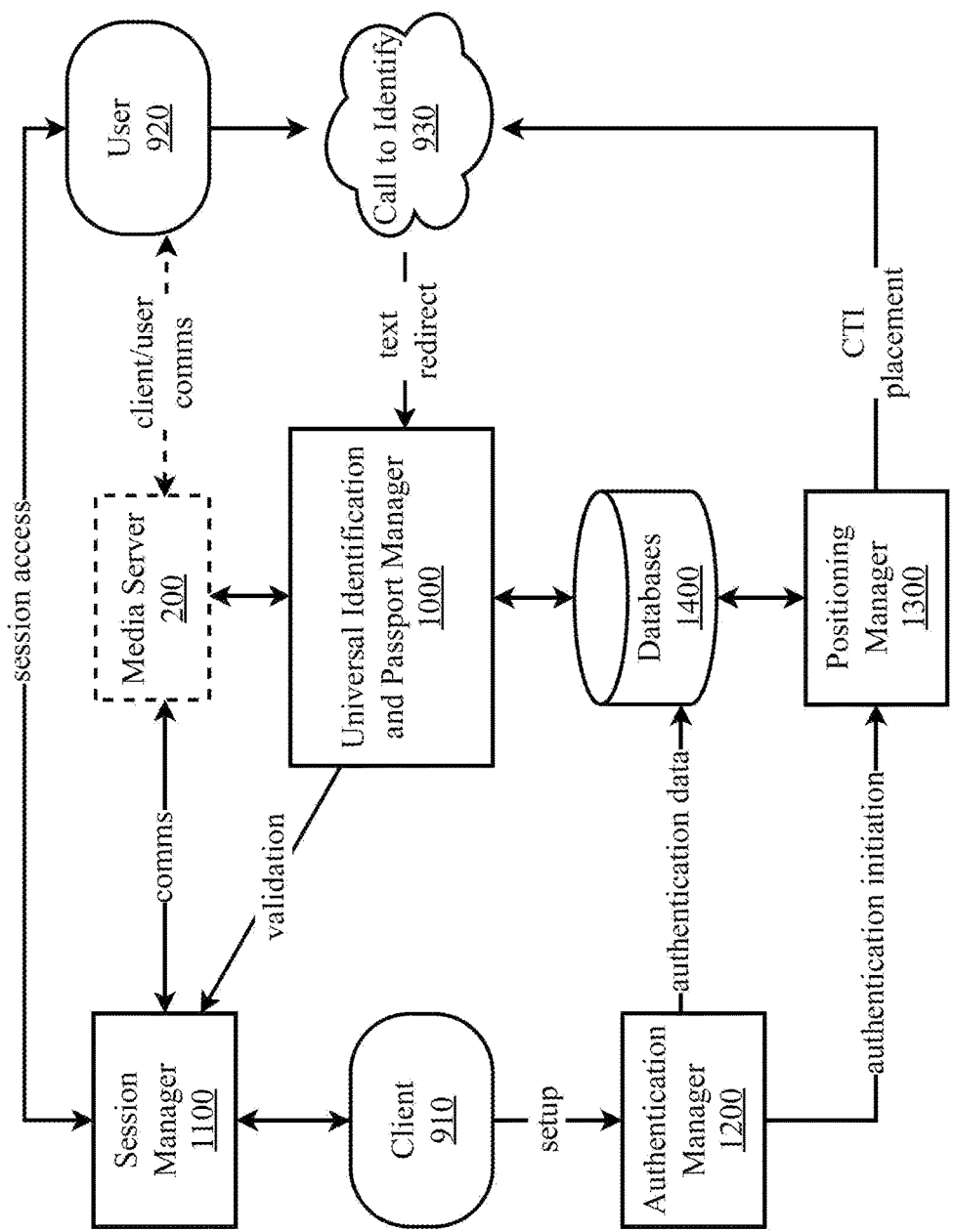
FIG. 9 is an exemplary system architecture of a universal identification and passport management system using a phone identifier and text redirect.

FIG. 9 is an exemplary system architecture of a universal identification and passport management system using a phone identifier and text redirect. In this exemplary embodiment, the system comprises a universal identification and passport manager 1000, a media server 200, a session manager 1100, an authentication manager 1200, a positioning manager 1300, and databases 1400. The system facilitates user identification and access authorization between clients 910 and users 920 using calls to identify 930. A client 910 is any system or app seeking to identify a user and validate their access privileges and which has set up authentication instructions for that purpose. A user 920 is any person seeking to authenticate their identity and receive validated access privileges with a client 910. Identification and authentication between clients 910 and users 920 are initiated by a user's interaction with a call-to-action (CTA) 930. A CTA 930 means any design to prompt an immediate response or encourage a user device to identify itself and the user with which it is associated. For online and other digital CTAs (e.g., clickable buttons, links, digital sign on, NFC beacons), the CTA 930 will generally be generated and placed by the system in accordance with a client's 910 authentication rules. However, non-electronic CTAs are also possible such as printed CTAs in print advertising, signage, or in-store displays.

The universal identification and passport manager 1000 acts as the validation interface between client and user, validating the user's identity through various identifiers (phone number, international mobile equipment identity (IMEI) code, biometric data, IP address, user identity data). The media server 200 acts as the communication channel interface between client and customer devices, passing various forms of communications media (emails, texts, traditional telephone, VOIP, etc.) between the devices. The session manager 1100 creates and manages each validated session between a client and user by creating a session initiation protocol (SIP) communication session for each validated session between a client and user using the CTA validation, the user's universal identification passport, and information about the client/user communications through the media server 200. The session manager 1100 monitors and logs the session, checks for activity-based de-authentication cues, and de-authenticates the session when an activity-based de-authentication cue is identified and activity is not resumed, the session validation times out based on the client's authentication instructions, or the user ends the session. The authentication manager 1200 provides the client with an interface through which the client may create authentication instructions which may be dynamically adjusted based on feedback from user interactions with CTAs and other information. The positioning manager 1300 creates authentication instances from an instruction, and automatically determines where and when to place CTAs for each authentication instance depending on scheduling, targeting, and budgeting goals. The databases 1400 store authentication instructions, client information, and user information.

Figure 10:
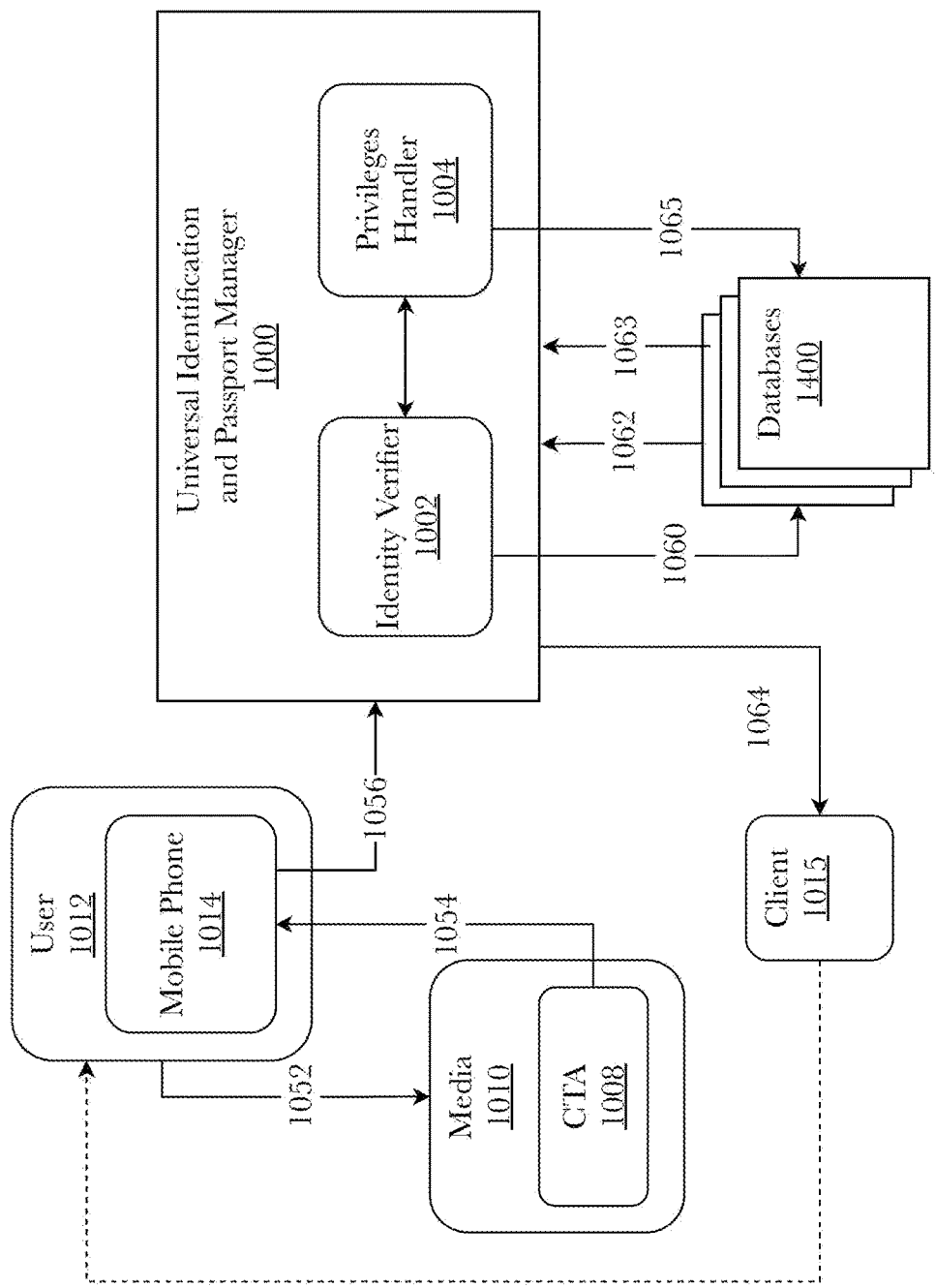
FIG. 10 is a block diagram illustrating an exemplary universal identification and passport manager aspect of a universal identification and passport management system using a phone identifier and text redirect.

FIG. 10 is a block diagram illustrating an exemplary universal identification and passport manager aspect of a universal identification and passport management system using a phone identifier and text redirect. Universal identification and passport manager 1000 links to an initiating "call-to-action" (CTA) 1008 associated with a request for user authentication. A CTA 1008 may be embedded in media 1010 of various forms, a preferred form being a NFC-enabled beacon broadcasting the CTA or a scannable QR code, however, other forms are anticipated including, but not limited to, a clickable button hosted on a website or a clickable link served via email which, on user interaction, triggers a text redirect, executing code to propagate an SMS or MMS message on the user's mobile phone or device containing an authentication identifier.

Initialization of universal identification and passport manager 1000 comprises storing authorization instructions and user information, including user identity and user privilege data, in databases 1400 and everything related to the authorization (e.g., procedures, instructions, rules, initiator ID, etc.) is called a procedure 1080. The identifier may be autogenerated by an algorithm, or taken sequentially from a list, or other methods known to those in the art. Additionally, each procedure must have at least stored authentication instructions for identifying a user 1012 through their mobile phone 1014 using at least the identifier, the user's phone number, and the user's device IMEI. Other factors may be utilized including but not limited to location-based services, facial recognition, previous user interactions and session data and so forth.

A CTA 1008 containing the unique identifier may be generated embedded in appropriate media 1010 for the client's authentication and security goals. A non-exhaustive list includes printed materials such as billboards, posters, and flyers; and electronic means such as clickable buttons, advertisements, URLs, push notifications, etc.

With the universal identification and passport manager 1000 initialized, a user 1012 will observe media 1010 containing a CTA 1008 and use his or her mobile phone or device 1014 to engage 1052 with the media 1010 and trigger the CTA 1008, for example scanning a QR code, which will cause the device 1014 to perform a text redirect by propagating a text message 1054 with destination and content including at least the identifier associated with the specific CTA instance. The user 1012 need only press the send key/button to send the message 1056. The message sent 1056 from the user's mobile phone 1014 is received by the universal identification and passport manager 1000 which logs at least the user's phone number and device IMEI from the message 1056. This data is first passed to an identity verifier 1002 which queries 1060 a user database 1400 using the phone number and device IMEI and returns a user identity 1062. The identity verifier 1002 also queries 1060 an authentication database 1400 using the identifier to return a specific set of authentication instructions 1063. The identity verifier 1002 uses the returned data to validate the user identity using the stored data associated with the specific user 1012 and by following the authentication instructions 1063. In one embodiment, the universal identification and passport manager then notifies 1064 the client 1015 of the successful verification and the client acts based on that notification. In another embodiment, the identity verifier 1002 passes the successful verification to the privileges handler 1004 for privilege management handled within the universal identification and passport manager 1000, such as saving login credentials for an online service or website to the user database 1400. Other privilege handling functions include updating 1065 the user information with new privileges, increased or decreased privileges, or removing stored privileges from the user's saved information. In one example, a client which is a website sets up authenticate via Whisp which enables users to create an account using the universal identification and passport manager. The user, while visiting the website using their mobile phone, clicks a button or text to initiate the authentication protocol, propagating the text message on the user's phone. The user taps the send button, prompting the universal identification and passport manager to retrieve the client's saved authentication instructions, identify the user by providing at least the user's phone number to the client, and grant new account privileges and save them to the user identity profile stored in the user database. At the same time, the user may opt in to receive marketing messages from the client via SMS or MIMS. This method provides the user with increased ease of identification as well as increased security by reducing the amount of user data stored across client accounts.

Figure 11:
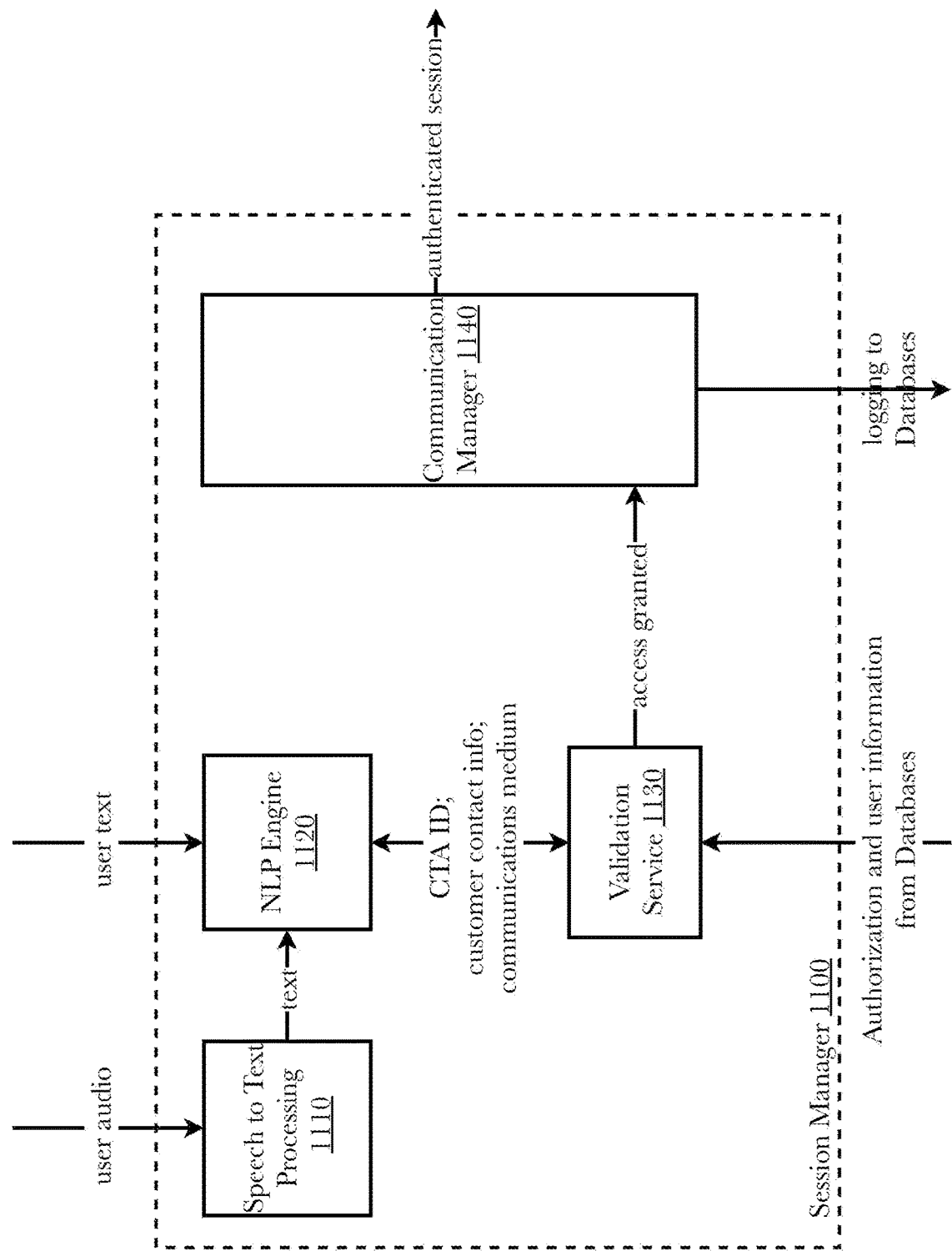
FIG. 11 is an exemplary session manager aspect of a universal identification and passport management system using a phone identifier and text redirect.

FIG. 11 is an exemplary session manager aspect of a universal identification and passport management system using a phone identifier and text redirect. The session manager 1100 creates and manages authenticated sessions between a client and user by creating a session initiation protocol (SIP) communication using the CTA identifier, the user's identification and privilege information, and information about the resources being accessed. The session manager 1100 monitors and logs the session, and terminates the session when the authentication expires or de-authentication is triggered, such as when a time-limited authentication reaches the maximum allotted time without renewal by the user, when there has been no user activity for a client-specified amount of time, the user has left the physical location, the user has entered a different authorization area, the user has accepted an SMS offer to de-authenticate, or the user has interacted with a CTA embedded with de-authentication instructions, such as tapping out of a service or location. The session manager 1100 may also manage multi-authentication sessions where the user interacts with a multi-session CTA and the session manager passes the user identification data to automatically identify the user for each successive CTA interaction. For example, a security guard patrolling a shopping mall may interact with a CTA to open a multi-session CTA for the duration of a scheduled shift, where the shopping mall uses NFC beacons to limit access to storage rooms, non-public entry points or corridors, individual units, etc. After the security guard completes the initial multi-session CTA, the security guard is identified and authorized. The authorization may be limited to a specific time frame before requiring a renewal, which may be performed via SMS request from the universal identification and passport manager with an SMS response from the user. During the authenticated period, the security guard may access any resource for which privileges were initially identified; approaching an NFC-enabled locked door while carrying the user computing device will unlock the door for the security guard to pass through. Passively triggering another CTA embodied in an NFC beacon on the other side of the door may lock the door behind the security guard. This multi-session CTA may be de-authenticated following de-authentication instructions set by the client, such as on deviation from the anticipated access route or time between access points, requiring re-authentication to continue or triggering a notification to the client of a deviation.

In this embodiment, the session manager comprises a natural language processing (NLP) engine 1120, a target selector 1130, and a communication manager 1140.

In an embodiment, an identifier for the CTA is obtained from a text message from the user following an interaction with a CTA and the text from the interaction with the CTA is sent to a natural language processing engine 1120 which parses the text to extract the CTA ID and possible other contextual information (such as additional authentication added to the identification by the client, e.g., a passcode or security phrase automatically embedded in the propagated SMS, added to the SMS by the user, or requested via SMS following the initial SMS and subsequently provided by the user) along with the user identification information. Using the CTA identifier, the authentication instructions associated with the CTA identifier and user identification and privileges information are retrieved from a database for the relevant access point, and a validation service verifies that the user identification and privileges satisfy the requirements listed in the authentication instructions. Access is granted after validation succeeds. A communication manager 1140 of the session manager 1100 may then initiate an authenticated session between the client and user, monitor and log the session, renew or de-authenticate the user's access, and terminate the session. In another embodiment, a user may interact by sending voice notes or audio clips rather than a text message which is then passed through speech to text processing 1110 and converted to text and passed to the NLP engine 1120.

Figure 12:
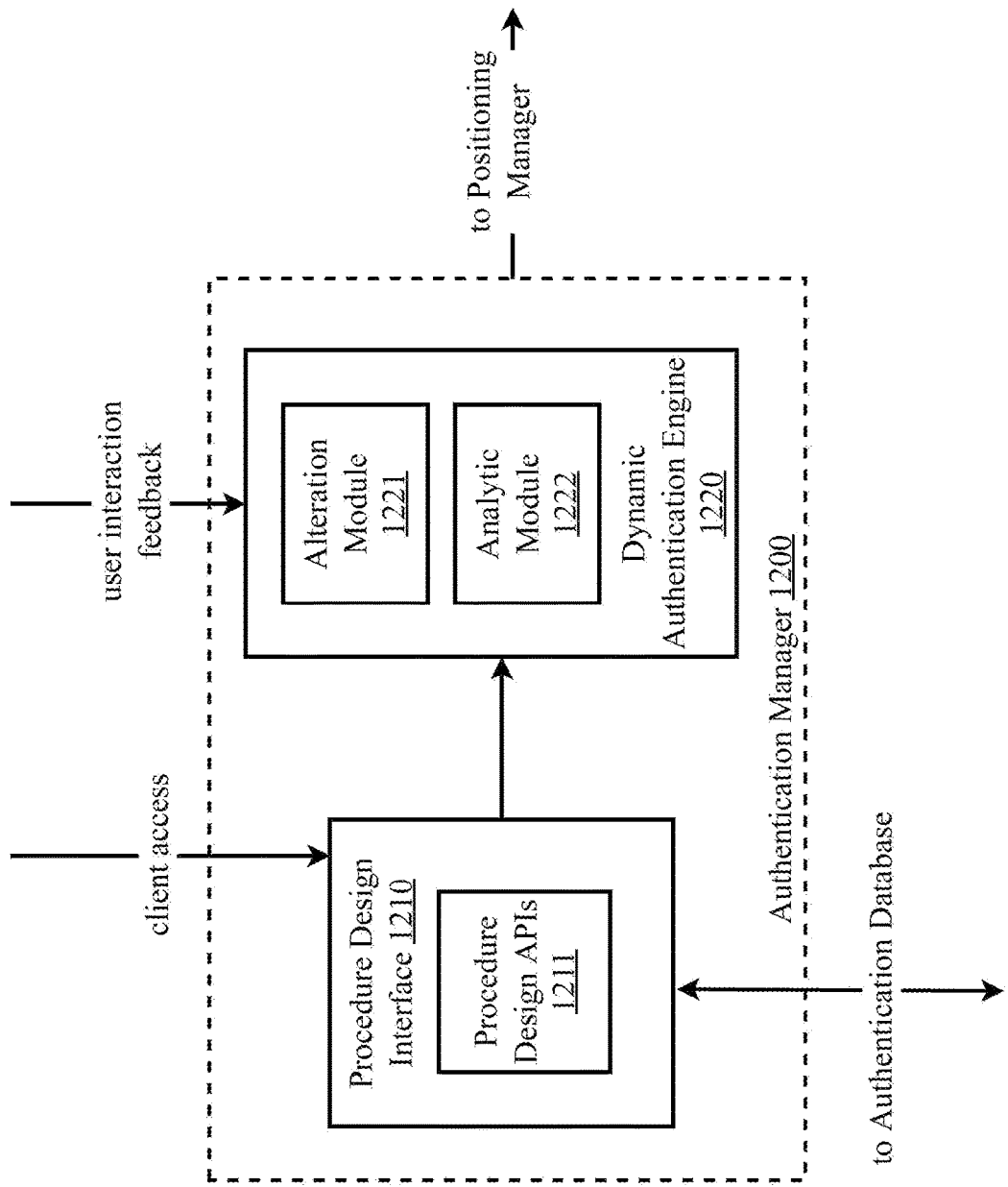
FIG. 12 is an exemplary authentication manager aspect of a universal identification and passport management system using a phone identifier and text redirect.

FIG. 12 is an exemplary authentication manager aspect of a universal identification and passport management system using a phone identifier and text redirect. This diagram is derived from the previous system architecture diagram of FIG. 26 of the parent application (63/319,314) and prior applications that have been incorporated herein by reference. The authorization manager 1200 provides the client with an interface through which the client may create automated authentication procedures which may be dynamically adjusted based on feedback from user interactions with CTAs and other information. In this embodiment, the procedure manager comprises a procedure design interface 1210 and a dynamic authentication engine 1220.

The procedure design interface 1210 comprises one or more procedure design APIs 1211 which allow clients to set up procedures comprising location and service access, account logins, privilege requirements, authentication instructions, maps of authentication systems including access points and area restrictions, etc. Each procedure design API 1211 provides one or more aspects of the interface such as a graphical interface, requirements or instructions creation tools, mapping tools, credential conversion tools, etc., and the collection of the procedure design APIs 1211 allows the client to define complete authentication procedures, which are stored in the authentication database of the databases 1400.

Once an authentication procedure is created and implemented, the dynamic authentication engine 1220 can be configured to make automatic changes to the procedures (or an aspect of a procedure) based on feedback from interaction with CTAs and other information such as session data. In some embodiments, authentication variants may be generated manually or semi-autonomously with input from the client. For example, dynamic authentication engine 1220 may receive data associated with an authentication procedure and analyze it, and based on the analytic data it may suggest an element to be altered, which can then be reviewed and implemented by a client representative such as an IT manager or security manager. In some embodiments, authentication variants may be generated autonomously. For example, dynamic authentication engine 1220 may receive analytic data associated with an authentication procedure and based on the received data it may suggest an element of an authentication to be altered, which can be automatically applied to the authentication via the authentication procedure data stored in authentication database 1410.

A purpose of utilizing authentication variants is to gather useful data about the efficacy, efficiency, and security of a given authentication and/or an authentication procedure. Implementing two similar authentications with the only difference between the two being a single element alteration (i.e., A/B testing) can allow clients to understand how elemental choices for an authentication affect client interaction. For example, an authorization procedure for an online streaming service may be developed to enable clients to more easily and securely identify themselves to access their accounts from new or temporary locations and a variant authorization may be developed embodying the CTA in a different method or requiring different identification information to grant access. Both the baseline authentication and the variant authentication can then be deployed and user engagement data with both the baseline and variant can be monitored and analyzed to determine which of the baseline or the variant led to better outcomes for the client requiring the identification. In some embodiments, test plans may be received, retrieved, or otherwise obtained from authentication database 1410 by dynamic authentication engine 1220 as an input into suggesting element alterations.

According to some embodiments, the analytic module 1222 may receive, retrieve, or otherwise obtain a plurality of data such as, but not limited to, details of interactions with CTAs, interaction data, session data, and authentication data, and may process the plurality of data in order to determine the efficacy of a given authentication and/or authentication procedure. In some embodiments, analytic module 1222 may receive data pertaining to at least two authentications comprising a baseline authentication and a variant authentication, and determine which of the two authentications produced better results based upon analysis of the received data.

Figure 13:
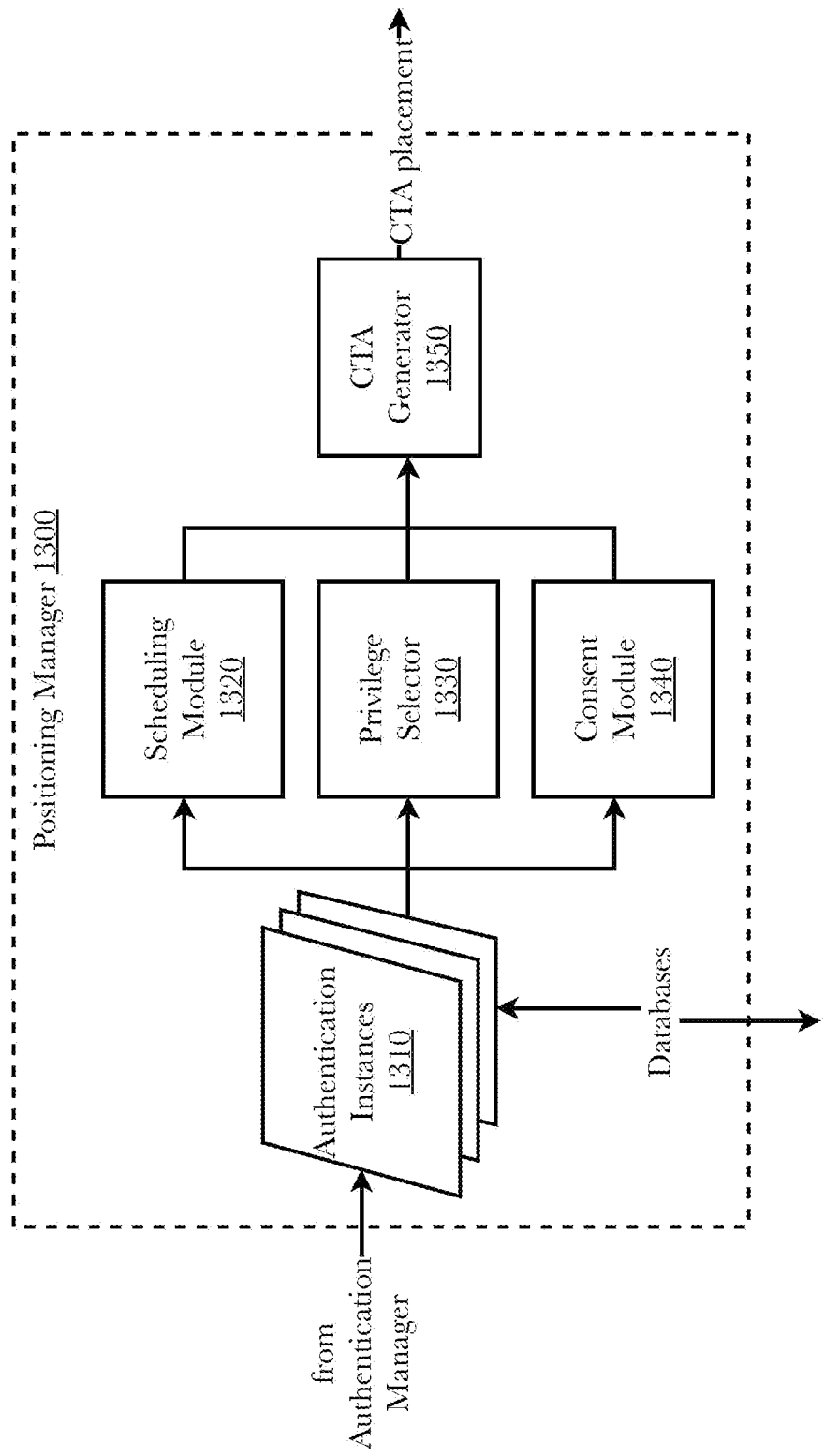
FIG. 13 is an exemplary positioning manager aspect of a universal identification and passport management system using a phone identifier and text redirect.

FIG. 13 is an exemplary positioning manager aspect of a universal identification and passport management system using a phone identifier and text redirect. In this embodiment, the positioning manager 1300 creates authentication instances from a client's authentications, and automatically determines where and when to place CTAs for each authentication instance depending on scheduling, privilege, and communication goals.

The positioning manager 1300 receives notification of the initiation of an authentication scheme from the authentication manager, retrieves relevant information about the authentication from the databases 1400, and creates one or more authentication instances 1310 for implementation of the authentication. Not all authentication will have multiple instances. Depending on the authentication configuration, each authentication instance will represent some portion or division of the authentication for implementation. For example, in an authentication scheme for a bank location, instances may be generated for different physical areas which will be assigned different schedule or privilege requirements for granting access, such as time limiting patron access to teller-assisted banking areas or requiring employee privileges to access certain areas. Authentication instances 1310 will typically have rules associated with scheduling, privileges, and communications. In this embodiment, each instance is analyzed by a scheduling module 1310 to identify scheduling rules and constraints and output an authentication schedule, a privilege selector 1330 to identify privilege requirements and output a required privileges selection range, and a consent module 1340 to identify communication requests for the instance and output requested communications for obtaining user consent within the instance. The outputs of the scheduling module 1320, privilege selector 1330, and consent module 1340 are sent to a CTA Generator 1350 which generates an appropriate CTA to a user mobile device in accordance with the client's authentication parameters.

Figure 14:
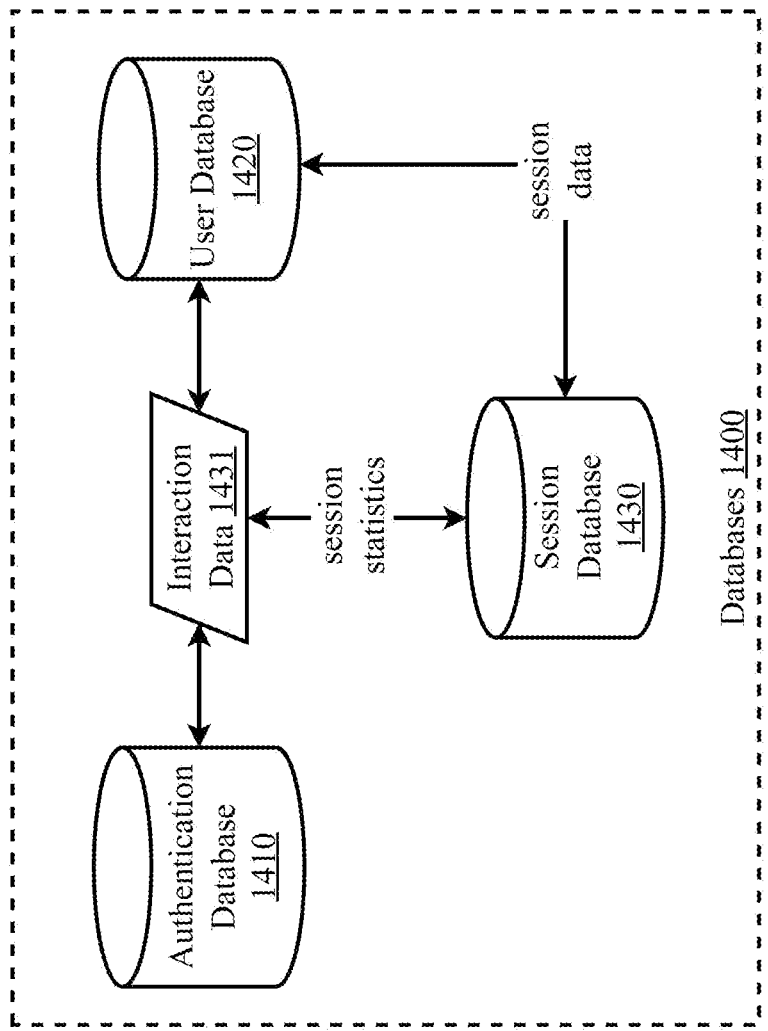
FIG. 14 is an exemplary set of databases for a universal identification and passport management system using a phone identifier and text redirect.

FIG. 14 is an exemplary set of databases for a universal identification and passport management system using a phone identifier and text redirect. The databases 1400 store authentication information, user information, and session information.

The authentication database 1410 comprises information about the client for facilitating identification between clients and users such as client credential requirements; instructions for authentication a user computing device; maps of authentication systems including access points and area restrictions; and additional authentication information such as time limitations, renewal allowances, and privilege requirements. The authentication database 1410 may be configured to store a plurality of authentication instructions including the associated authentication instructions for each authentication instance. In some embodiments, the authentication instructions specify a plurality of accesses that will be granted to the user computing device.

The authentication database 1410 may take the form of a managed or unmanaged database, document-oriented database system, or SQL database, or other suitable form of database. Examples of types of database software that may operate include MYSQL™, ORACLE DATABASE™, MONGODB™, and others. The authentication database 1410 may exist as a distinct physical device or be operating on another computing device that may perform other functions aside from operating, hosting and serving the authentication database 1410. If the authentication database 1410 is a distinct physical device, the database may be connected over a LAN or WAN, the Internet, a direct physical connection to another device, or some other network connection. The authentication database 1410 may be a centralized database system. The authentication database 1410 may be a distributed database system.

The user database 1420 comprises information about users for facilitating identification and communication between clients and user computing devices. This information is stored in a user identity profile. Each profile must include at least the user's phone number and device IMEI but may further include such information as the user's IP address, name, address, shipping address, billing information, contact information, user preferred contact method (e.g. mobile phone, e-mail), user previous interaction history, and user privileges granted on third-party client systems.

The session database 1430 comprises information about previous sessions for facilitating identification between clients and user computing devices, identifying authentication issues, optimizing client communications.

Interaction data 1431 may be generated from any interactions between clients and user computing devices, and may be stored in any of the three databases 1410-1430, as necessary.

Figure 15:
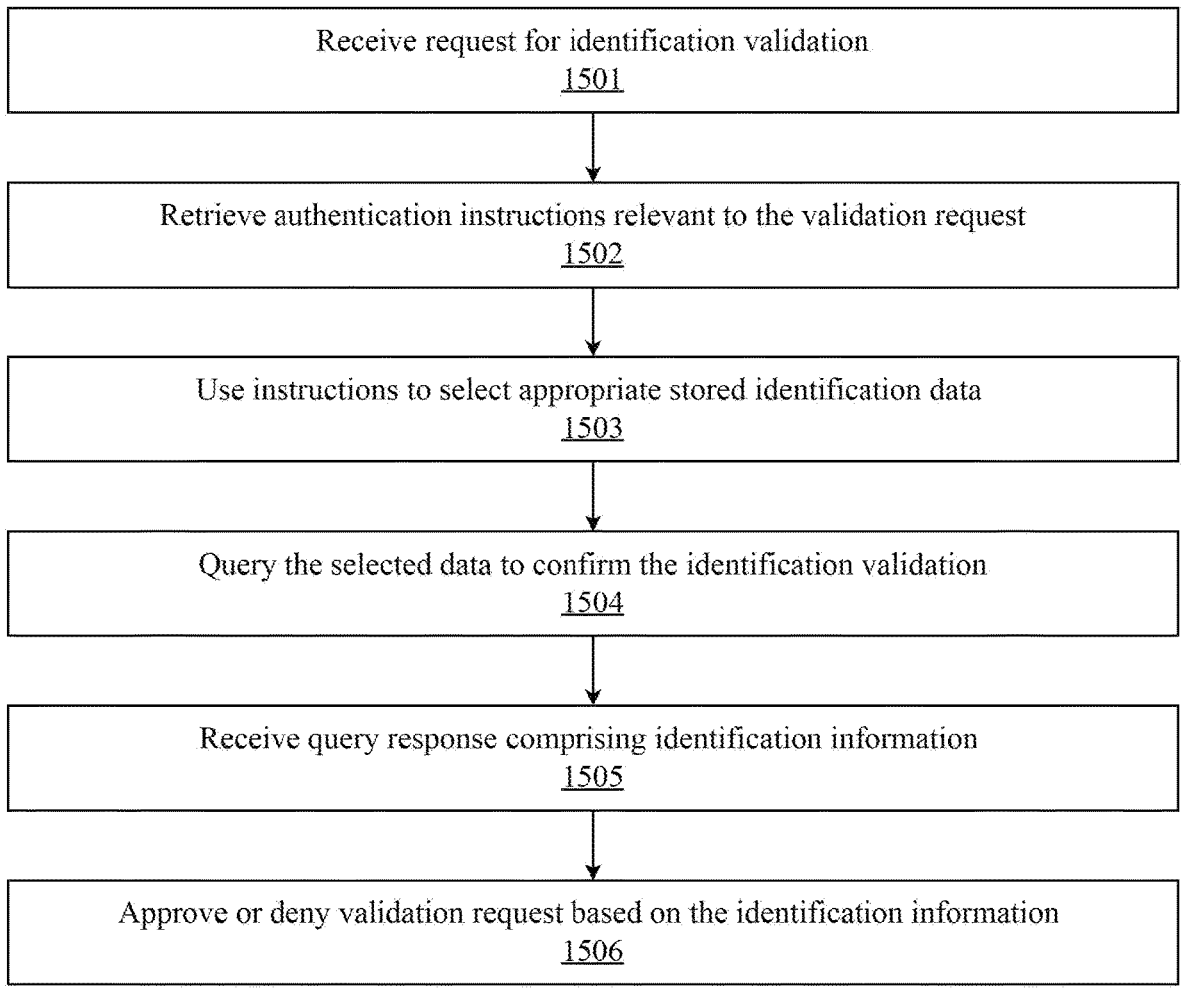
FIG. 15 is a flow diagram illustrating an exemplary method for identifying a user via a mobile phone and text redirect.

FIG. 15 is a flow diagram illustrating an exemplary method for validating a user's identity via a mobile phone and text redirect. The identification is initialized by providing a user with a mobile phone some means by which they may initiate a communication related to providing identification. Such means may comprise a clickable login via Whisp button on a website or a QR code located on a Netflix login screen while staying at a short-term housing rental, among many other options and combinations. When the user interacts with the call-to-action (e.g., clicks the login via Whisp button, scans the QR code, etc.) a text message is auto populated on the user's phone. The means to produce both the content of the text message and the text message itself may happen in various ways, such as appending the message contents to the URL or embedding it within the QR code. Each means may also have a way to embed other contextual information for the purposes of strengthened identification validation. This "other context" may include the time the interaction was initiated, locality data, identifying information from the mobile phone or user, and other data useful for such interactions. After the text message and its contents populate on the user's phone, the user only needs to tap the send text button on the phone. The text message is then sent to a universal identification and passport manager which performs validation against stored user information.

In a first step 1501, a user's text message requesting identification validation is received by a universal identification and passport manager. The message may comprise at least the phone number and IMEI from the phone which sent the message but may also comprise additional information required by the client. The request may also comprise information relating to the type of validation or reason for the validation which may be used to determine which stored instructions are relevant to validating the identification request 1502. For example, the universal identification and passport may be used to grant a user access into varying parts of a secured facility such as a bank or hotel. The instructions may be different depending on what area the user wishes to access; for example, a user scanning a QR code on their hotel door may only be required to tap to send the redirected test message to gain entry to their hotel room. In contrast, entry into a bank lobby after hours to use a secure ATM machine might further require biometric data for identity verification, where a user interacts with a call-to-action and must also step forward to be photographed.

In other words, a request to identify a person is received which comprises information enabling the validation service to retrieve instructions containing verification procedures for sufficient validation of the user's identity. With the proper instructions selected, the validation service now selects the appropriate validation data from stored user identification data 1503 from which to query for the purposes of confirming the identification validation 1504. The instructions may tell the validation service where to find the address or location of one or more data sources. Once a response to the query containing the appropriate identification information is received 1505, the identification information is compared to the instructions which provide a means to know whether the user identification is validated, i.e., the instructions confirm approval or denial of the identification request based on the validation information which may then be forwarded onto the requester of the identification validation 1506.

Figure 16:
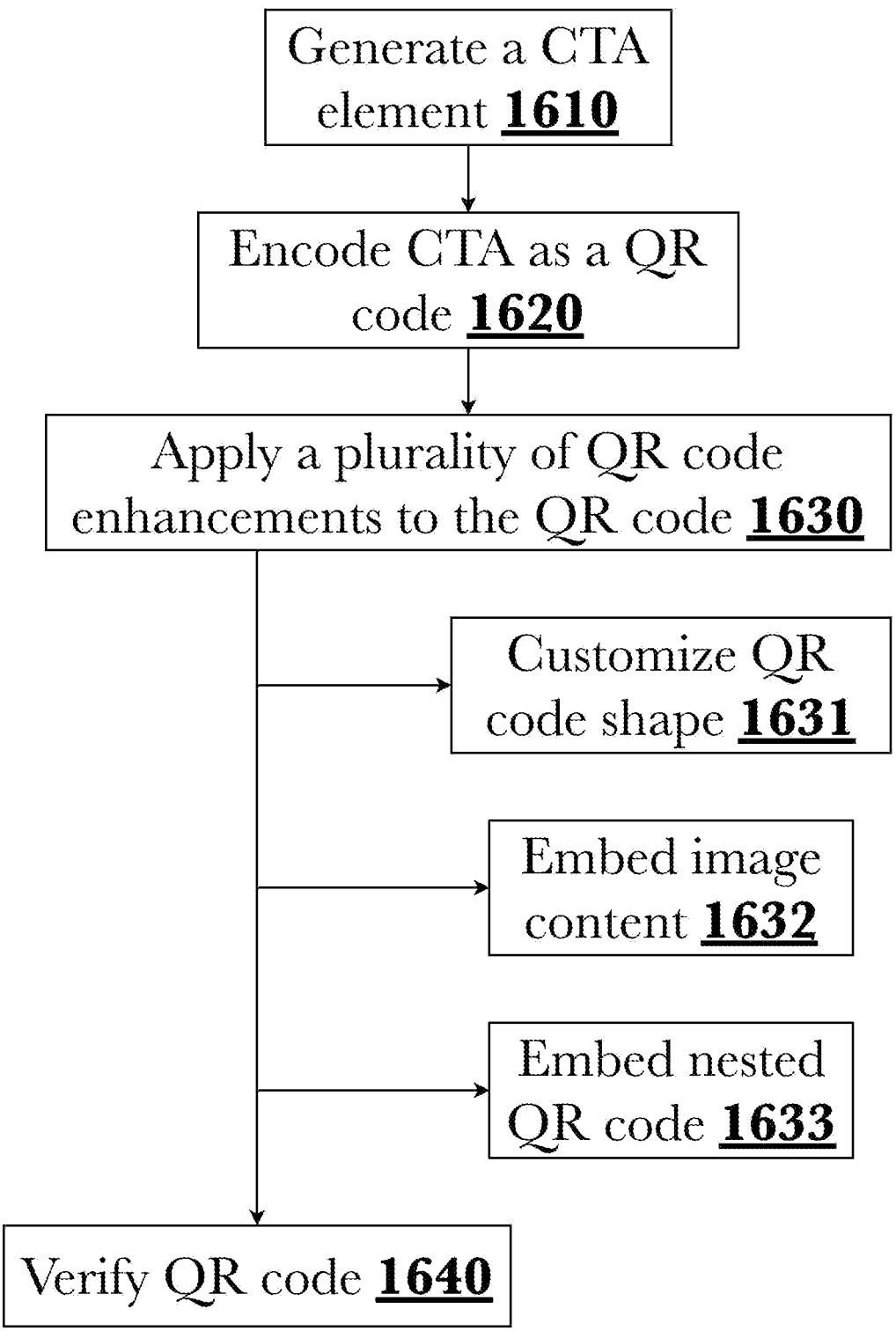
FIG. 16 is a flow diagram illustrating an exemplary method for generating and verifying a call-to-action as an enhanced QR code.

FIG. 16 is a flow diagram illustrating an exemplary method 1600 for generating and verifying a call-to-action as an enhanced QR code. Initially 1610, a CTA 930 may be generated that comprises instructions or information such as (for example, including but not limited to) a uniform resource indicator (URI) that may be processed by a web browser or other software application. Generally, a URI is used to retrieve a webpage or formatted content that may trigger actions on a device, such as opening a text messaging application and pre-populating information within a message for a user to review and send. URIs may also comprise query fields that may be populated with information based on, for example, device hardware or software information such as a browser identifier, network connection, screen size, or other information that may be known by the device parsing the URI. The CTA instructions or content (such as a URI with query fields to provide device-specific information when scanned), may be encoded as a QR code 1620 by processing the text content of the CTA and translating it according to published QR code standards. For example, a standards-compliant QR code requires the use of a plurality of location indicators that a device camera uses to recognize the QR code from other image content within view, as well as a number of optional elements such as alignment indicators for larger QR codes to ensure accurate scanning (for example, when scanning a printed QR code from a page that may not be perfectly flat and perpendicular to a scanner lens). This produces a standard QR code comprising a two-dimensional (2D) array of visual elements that translates to the text content when scanned. To provide enhanced functionality, additional elements may then be incorporated 1630 into the QR code beyond what is required by a published standards specification, such as (for example, including but not limited to) the use of customized code shapes 1631, additional image content 1632, or the use of secondary embedded QR codes 1633 that may be placed within the enhanced QR code. Each of these enhancements may be used to provide additional data beyond what is possible with standard 2D encoding, and multiple elements may be combined as desired to achieve a particular CTA result. Finally, a software-based QR code interpreter may be used to translate the resulting enhanced QR code to ensure proper function 1640, such as verifying that any desired data fields are populated in a URI, the formatting and content are correct, and parsing the URI produces the expected CTA response.

Any number of QR codes and various instructions they comprise may be generated and optionally stored for future use or revision, and it thus is possible to maintain control over an already-published QR code through control of the database containing the CTA responses triggered by scanning the QR code. For example, a QR code comprising a URI that fetches web content (for example, such as a tailored web page designed to open a messaging application on a smartphone or other mobile device) may be modified by altering the web content that is served, without the need to change the encoded QR code content and publish a new code. By operating in a request-response arrangement, any number of QR codes may be published without need to update or modify their content in the future, and any changes may be performed at the database instead. This also provides functionality for disabling QR codes, or providing controlled access; for example, a QR code may comprise a URI that automatically submits certain device or user information with the request (for example, a device browser or operating system version). This user or device-specific information may be used when processing the URI and selecting web content to provide, such as to provide content that is compatible with a particular web browser application or operating system, or to provide specific content to certain devices or users while providing different content to others. This may be further expanded with any of a variety of advanced automation rules, such as scheduling rules that cause the behavior of a QR code to change based on date or time of day (for example, a QR code could provide special holiday content on certain days, or promotional content for a limited time), or rules that change the behavior of a QR code based not only on user or device information but on available third-party information that may be retrieved in response to a scan, click, or other interaction with the code.

Figure 17:
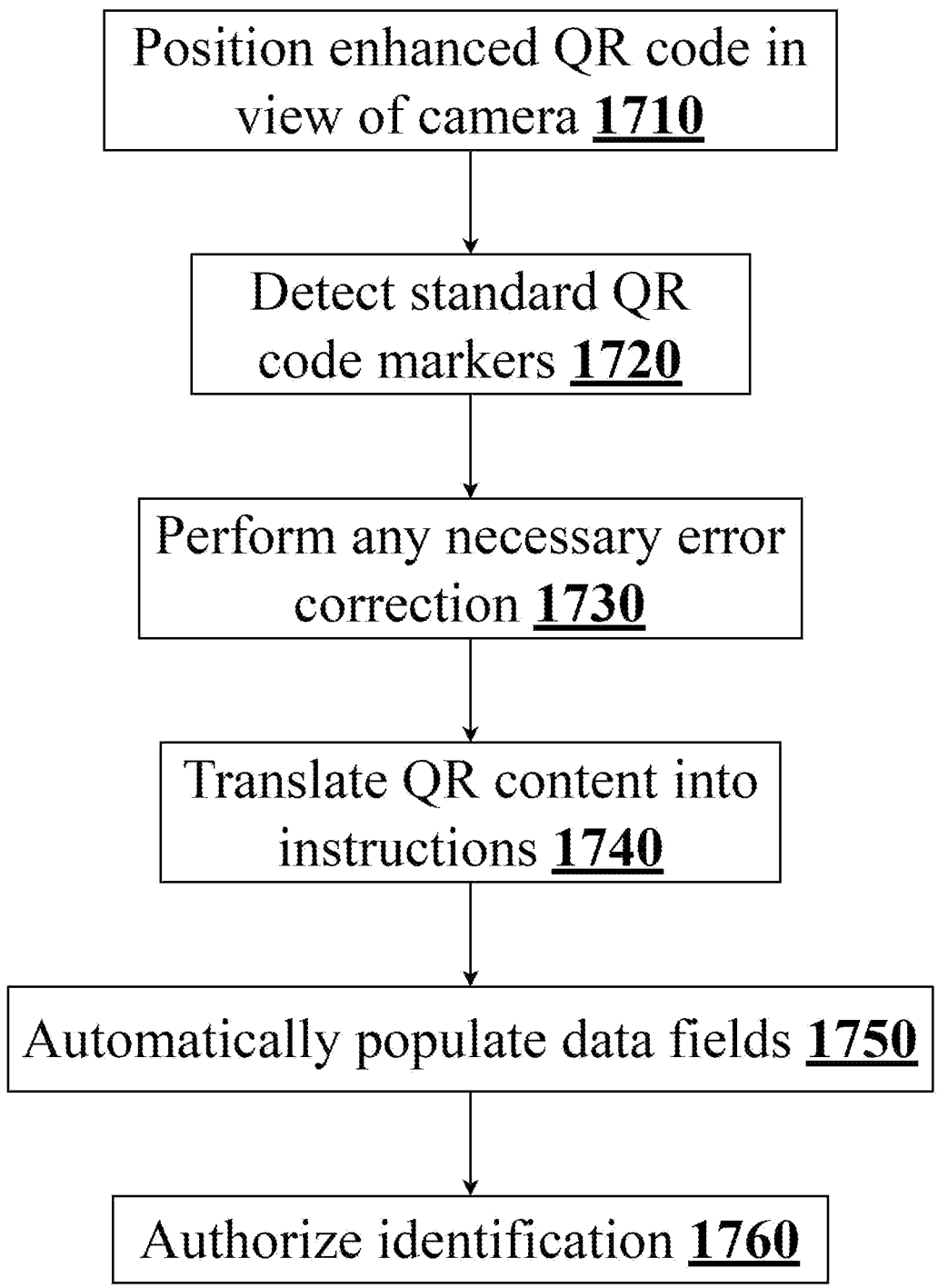
FIG. 17 is a flow diagram illustrating an exemplary method for scanning an enhanced QR code embodying a call-to-action.

FIG. 17 is a flow diagram illustrating an exemplary method 1700 for scanning an enhanced QR code embodying a call-to-action. When a user positions an enhanced QR code 1710 in view of their device camera, for example with a camera-enabled mobile device such as (for example, including but not limited to) a smartphone or tablet computing device, the camera software may recognize the QR code format from a plurality of standards-compliant elements 1720 such as location or alignment markers, as are specified in published standards specifications for QR codes. If the enhanced QR code utilizes a customized shape (that is, the encoded data takes a shape other than the standard square), the data may be read and processed normally using the embedded location and/or alignment markers; QR code standards specify certain measures in both the encoding and the reading of a code to account for damaged or obscured codes. If portions of the code are indeed damaged or obscured, such as a code printed on a wrinkled page or on a worn sign, the device may error-correct 1730 using embedded Reed-Solomon error correction codes that are specified as part of the QR code standards, ensuring the code is translated back into the correct text content without error. The content of the QR code may then be parsed 1740, for example opening an encoded URI in a web browser application on the device or executing instructions to perform any of a variety of actions. Information fields within an action or URI (for example, text fields in a message or email being generated, or query fields in a URI being parsed) that the device or browser may fill in automatically 1750, such as (for example) populating device hardware or software information, a timestamp, or data fields that may be populated using data in memory from any enhanced QR code elements that were scanned. For example, a URI field may be populated with information about an identified embedded image within an enhanced QR code, such as the name of a recognized individual. As another example, a URI may open a messaging application on the user's device and pre-populate information for sending a text message with specific content, such as (for example) a destination phone number or address, specific text fields such as a message title or body, or any other data that may be encoded within the QR code or retrieved in response to prompts or fields that are encoded. The user may then choose to authorize an identification request 1760, such as submitting a populated URI or sending a pre-populated text message, placing a phone call to a pre-populated number, or any other action that may be triggered on the mobile phone based on the content encoded within the scanned enhanced QR code.

Figure 18:
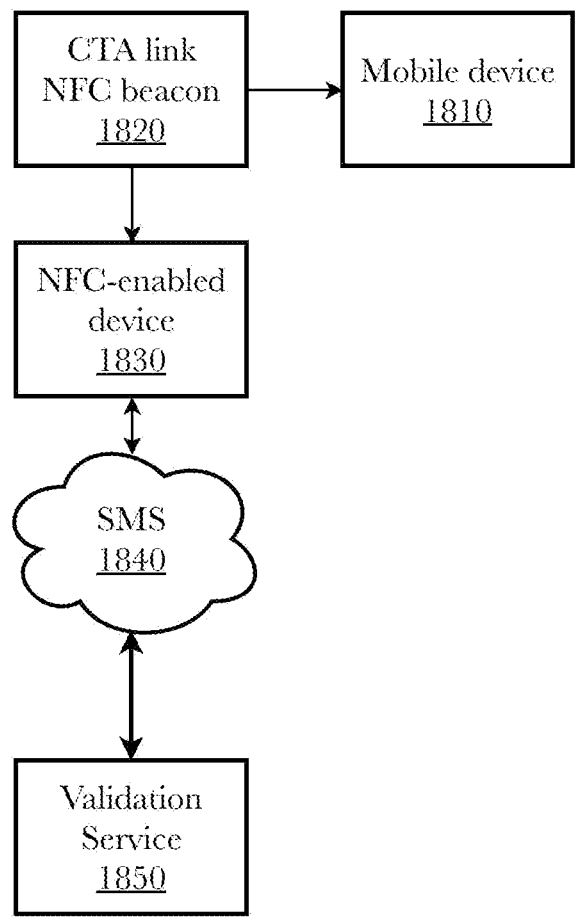
FIG. 18 is a system diagram illustrating an exemplary NFC device broadcasting a CTA.

FIG. 18 is a system diagram illustrating an exemplary NFC device broadcasting a CTA. A mobile device 1810 such as a smartphone, operates an operating system (OS) such as ANDROID™ or IOS™, although other OSs are possible. A mobile device may be a phone-enabled tablet or other device aside from a smartphone as well. Mobile devices of these sorts may run software applications, commonly referred to as an "app" (short for "application"), for a variety of purposes, and a mobile device 1810 may or may not contain communications other than or instead of cellular communications, including wireless internet capabilities, BLUETOOTH™ communications, and NFC capabilities. With a mobile device 1810 possessing such NFC capabilities, a CTA NFC beacon 1820 may communicate with such a mobile device 1810, the beacon 1820 being operated as part of an NFC-enabled device 1830. Such a device may be incorporated as an access control in physical objects such as a low proximity-distance tappable entry pad or embedded in or mounted onto access points including doors, or even as an NFC-enabled USB stick or any number of other objects that may have NFC technology on or inside of them. A CTA that may be broadcast by such as beacon 1820 would text redirect over SMS 1840 to a validation service 1850 for the purpose of propagating a text message on the mobile device containing user identification information wherein the validation service validates the user's identity and privilege level. In one embodiment, an employee within a secured facility such as a bank or hospital may approach an NFC-enabled access point with an NDC beacon broadcasting a CTA and simply tap to send the propagated text message verifying the employee's identity and access privileges to authorize access to the employee. The communication is not limited to only identification authentication but it can also record detailed access information including how long access was granted, the exact time access was granted, and the extent of access utilized by the user within their access privileges. In another embodiment, a user with temporary access privileges in a physical location, such as a visitor or event attendee, may identify themselves through such a system. This system provides advantages over an internet-reliant NFC system by enabling internet-less access for secure facilities or by enabling user identification where interne access may be spotty, unreliable, or overwhelmed.

Figure 19:
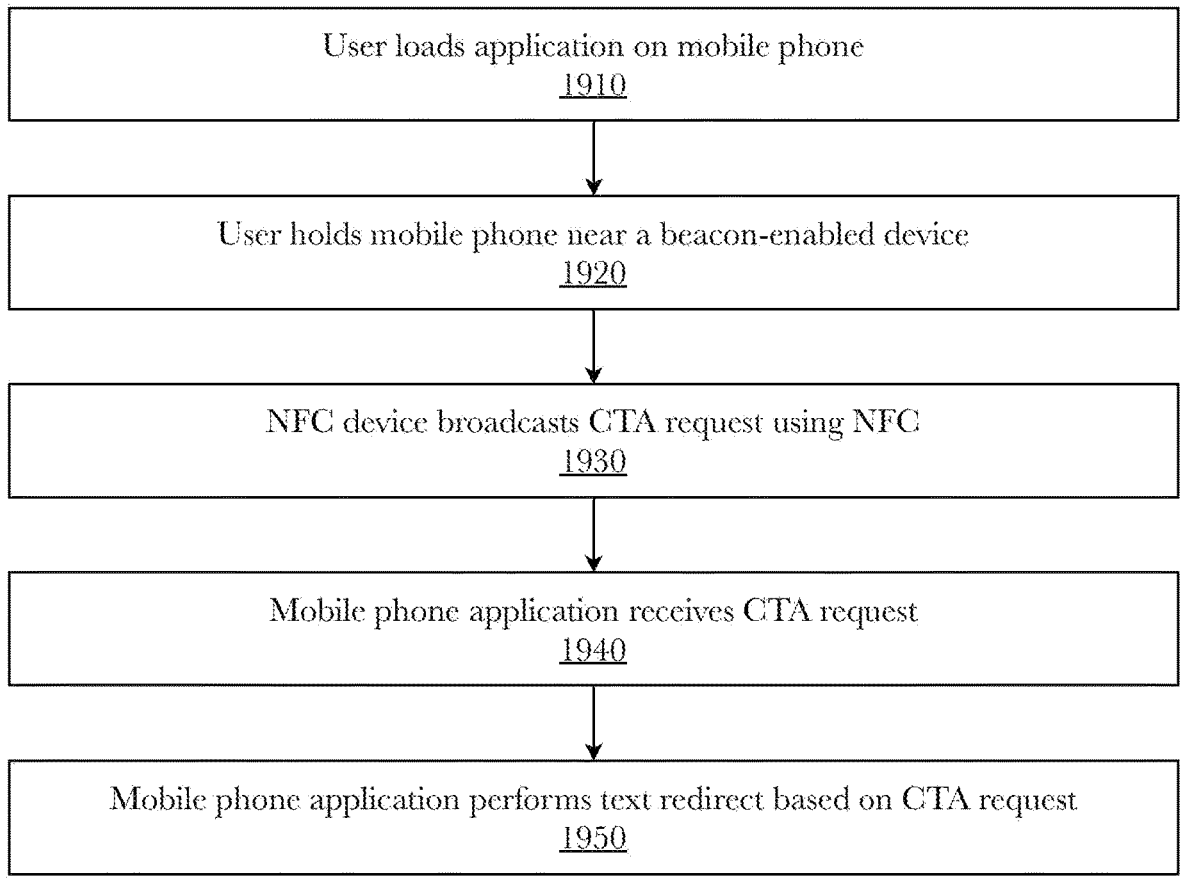
FIG. 19 is a method diagram illustrating an exemplary method for a NFC device to broadcast a CTA and a mobile phone act on the CTA.

FIG. 19 is a method diagram illustrating an exemplary method for an NFC device to broadcast a CTA and a mobile phone act on the CTA. First a user may load an appropriate application on their mobile phone 1910, the application or "app" being one which specifically communicates over NFC beacons to find 1920 CTAs to initiate an identification request a user's mobile phone, at which point the request is redirected appropriately to send an SMS message to a user to complete a CTA request. After initiating the application on a mobile phone 1910, a user may hold the mobile phone near or within range of a beacon-enabled device 1920, the NFC beacon-enabled device broadcasting a CTA request using NFC 1930 which may be received by a mobile phone application 1940. Upon reception in the mobile phone application, the mobile phone application acts on the CTA request to propagate a ready-to-send SMS text message 1950 as shown in other embodiments, whereby the SMS message containing the CTA response for a user to complete. A CTA may be a new user registration, services signup, purchase authorization, access privileges authentication, or something else requiring user identification.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 20:
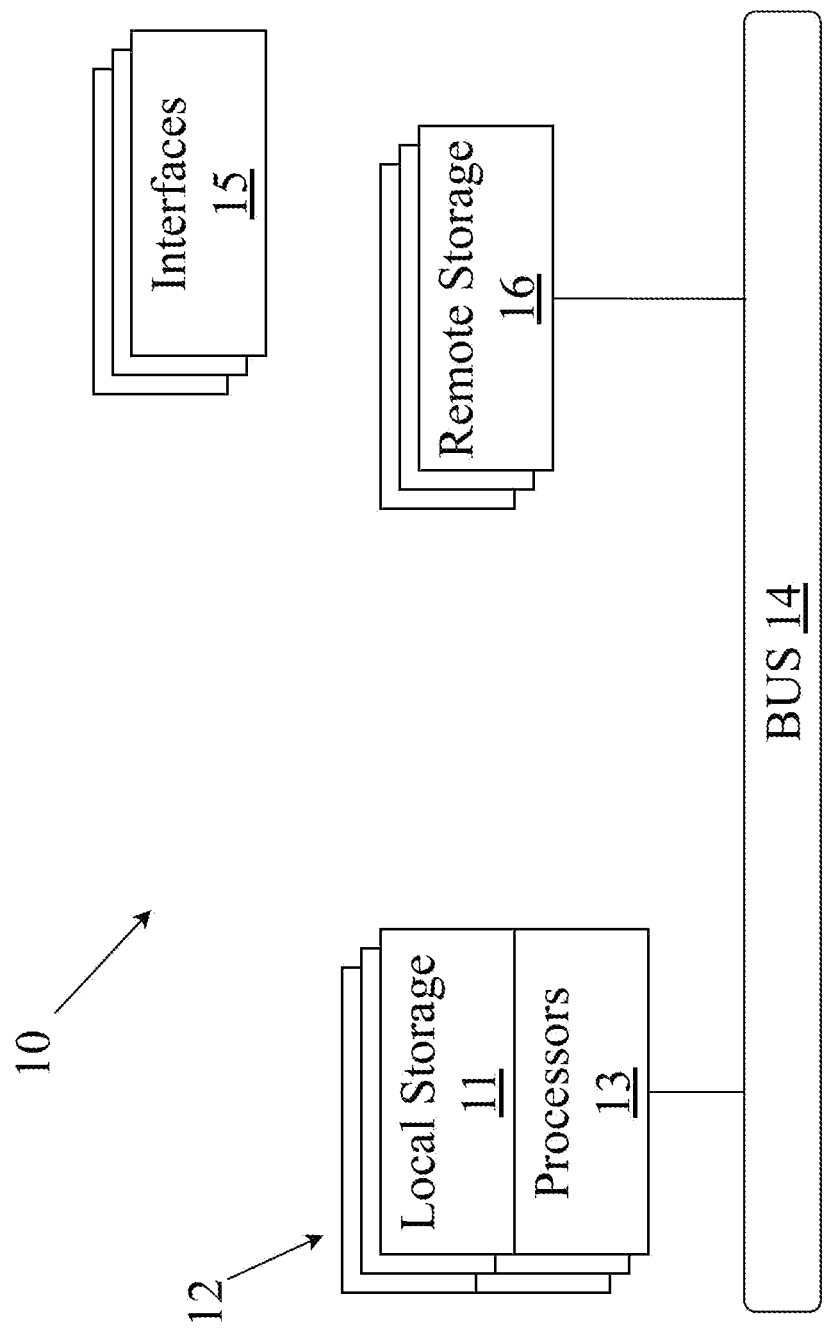
FIG. 20 is a block diagram illustrating an exemplary hardware architecture of a computing device.

Referring now to FIG. 20, there is shown a block diagram depicting an exemplary computing device 2010 suitable for implementing at least a portion of the features or functionalities disclosed herein. Computing device 2010 may be, for example, any one of the computing machines listed in the previous paragraph, or indeed any other electronic device capable of executing software- or hardware-based instructions according to one or more programs stored in memory. Computing device 2010 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 2010 includes one or more central processing units (CPU) 2012, one or more interfaces 2015, and one or more busses 2014 (such as a peripheral component interconnect (PCI) bus). When acting under the control of appropriate software or firmware, CPU 2012 may be responsible for implementing specific functions associated with the functions of a specifically configured computing device or machine. For example, in at least one embodiment, a computing device 2010 may be configured or designed to function as a server system utilizing CPU 2012, local memory 2011 and/or remote memory 2016, and interface(s) 2015. In at least one embodiment, CPU 2012 may be caused to perform one or more of the different types of functions and/or operations under the control of software modules or components, which for example, may include an operating system and any appropriate applications software, drivers, and the like.

CPU 2012 may include one or more processors 2013 such as, for example, a processor from one of the Intel, ARM, Qualcomm, and AMD families of microprocessors. In some embodiments, processors 2013 may include specially designed hardware such as application-specific integrated circuits (ASICs), electrically erasable programmable read-only memories (EEPROMs), field-programmable gate arrays (FPGAs), and so forth, for controlling operations of computing device 2010. In a specific embodiment, a local memory 2011 (such as non-volatile random access memory (RAM) and/or read-only memory (ROM), including for example one or more levels of cached memory) may also form part of CPU 2012. However, there are many different ways in which memory may be coupled to system 2010. Memory 2011 may be used for a variety of purposes such as, for example, caching and/or storing data, programming instructions, and the like. It should be further appreciated that CPU 2012 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 2015 are provided as network interface cards (NICs). Generally, NICs control the sending and receiving of data packets over a computer network; other types of interfaces 2015 may for example support other peripherals used with computing device 2010. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 2015 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 20 illustrates one specific architecture for a computing device 2010 for implementing one or more of the embodiments described herein, it is by no means the only device architecture on which at least a portion of the features and techniques described herein may be implemented. For example, architectures having one or any number of processors 2013 may be used, and such processors 2013 may be present in a single device or distributed among any number of devices. In one embodiment, a single processor 2013 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 2016 and local memory 2011) configured to store data, program instructions for the general-purpose network operations, or other information relating to the functionality of the embodiments described herein (or any combinations of the above). Program instructions may control execution of or comprise an operating system and/or one or more applications, for example. Memory 2016 or memories 2011, 2016 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 21:
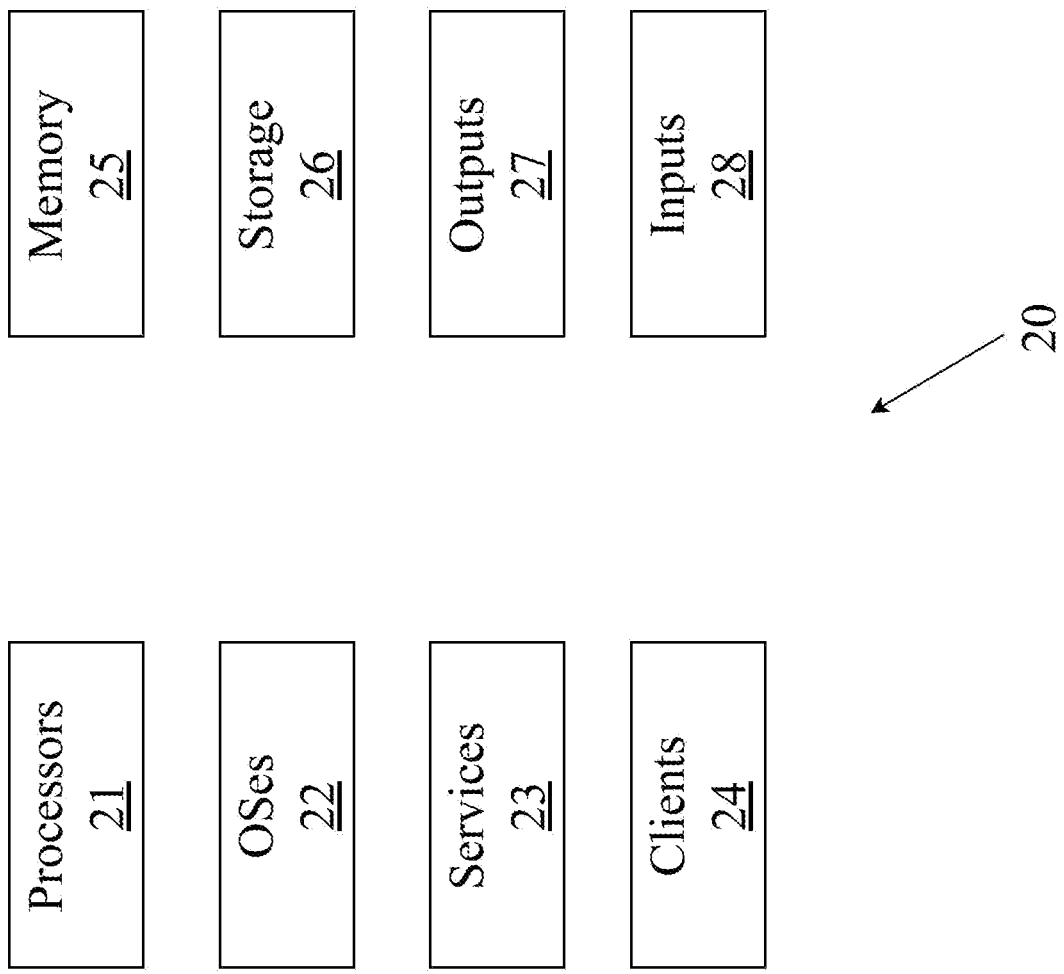
FIG. 21 is a block diagram illustrating an exemplary logical architecture for a client device.

In some embodiments, systems may be implemented on a standalone computing system. Referring now to FIG. 21, there is shown a block diagram depicting a typical exemplary architecture of one or more embodiments or components thereof on a standalone computing system. Computing device 2120 includes processors 2121 that may run software that carry out one or more functions or applications of embodiments, such as for example a client application 2124. Processors 2121 may carry out computing instructions under control of an operating system 2122 such as, for example, a version of MICROSOFT WINDOWS™ operating system, APPLE OSX™ or iOS™ operating systems, some variety of the Linux operating system, ANDROID™ operating system, or the like. In many cases, one or more shared services 2123 may be operable in system 2120, and may be useful for providing common services to client applications 2124. Services 2123 may for example be WINDOWS™ services, user-space common services in a Linux environment, or any other type of common service architecture used with operating system 2121. Input devices 2128 may be of any type suitable for receiving user input, including for example a keyboard, touchscreen, microphone (for example, for voice input), mouse, touchpad, trackball, or any combination thereof. Output devices 2127 may be of any type suitable for providing output to one or more users, whether remote or local to system 2120, and may include for example one or more screens for visual output, speakers, printers, or any combination thereof. Memory 2125 may be random-access memory having any structure and architecture known in the art, for use by processors 2121, for example to run software. Storage devices 2126 may be any magnetic, optical, mechanical, memristor, or electrical storage device for storage of data in digital form (such as those described above, referring to FIG. 20). Examples of storage devices 2126 include flash memory, magnetic hard drive, CD-ROM, and/or the like.

Figure 22:
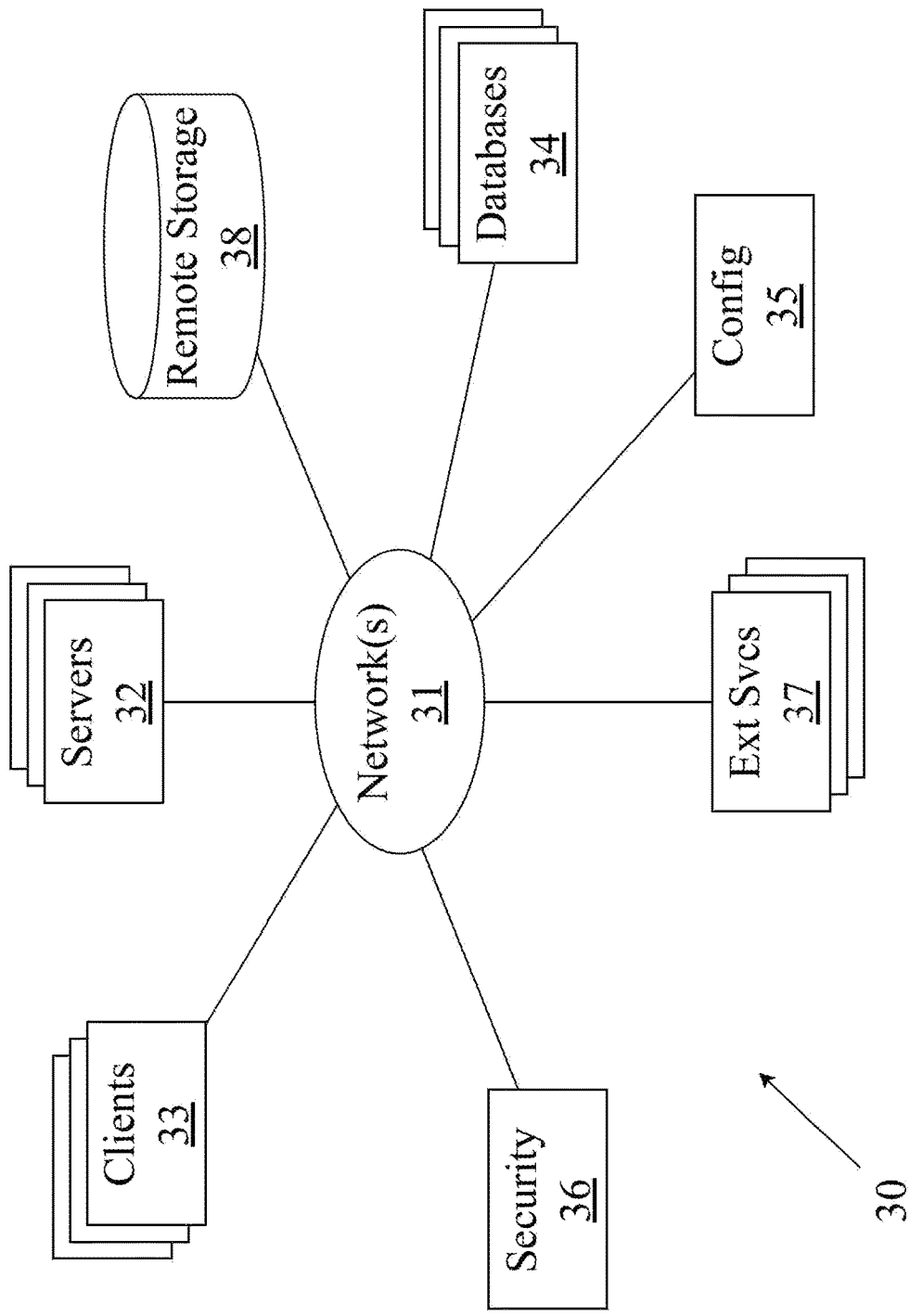
FIG. 22 is a block diagram showing an exemplary architectural arrangement of clients, servers, and external services.

In some embodiments, systems may be implemented on a distributed computing network, such as one having any number of clients and/or servers. Referring now to FIG. 22, there is shown a block diagram depicting an exemplary architecture 2230 for implementing at least a portion of a system on a distributed computing network. According to the embodiment, any number of clients 2233 may be provided. Each client 2233 may run software for implementing client-side portions; clients may comprise a system 2220 such as that illustrated in FIG. 21. In addition, any number of servers 2232 may be provided for handling requests received from one or more clients 2233. Clients 2233 and servers 2232 may communicate with one another via one or more electronic networks 2231, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art. Networks 2231 may be implemented using any known network protocols, including for example wired and/or wireless protocols.

In addition, in some embodiments, servers 2232 may call external services 2237 when needed to obtain additional information, or to refer to additional data concerning a particular call. Communications with external services 2237 may take place, for example, via one or more networks 2231. In various embodiments, external services 2237 may comprise web-enabled services or functionality related to or installed on the hardware device itself. For example, in an embodiment where client applications 2224 are implemented on a smartphone or other electronic device, client applications 2224 may obtain information stored in a server system 2232 in the cloud or on an external service 2237 deployed on one or more of a particular enterprise's or user's premises.

In some embodiments, clients 2233 or servers 2232 (or both) may make use of one or more specialized services or appliances that may be deployed locally or remotely across one or more networks 2231. For example, one or more databases 2234 may be used or referred to by one or more embodiments. It should be understood by one having ordinary skill in the art that databases 2234 may be arranged in a wide variety of architectures and using a wide variety of data access and manipulation means. For example, in various embodiments one or more databases 2234 may comprise a relational database system using a SQL, while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 2236 and configuration systems 2235. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 2236 or configuration system 2235 or approach is specifically required by the description of any specific embodiment.

Figure 23:
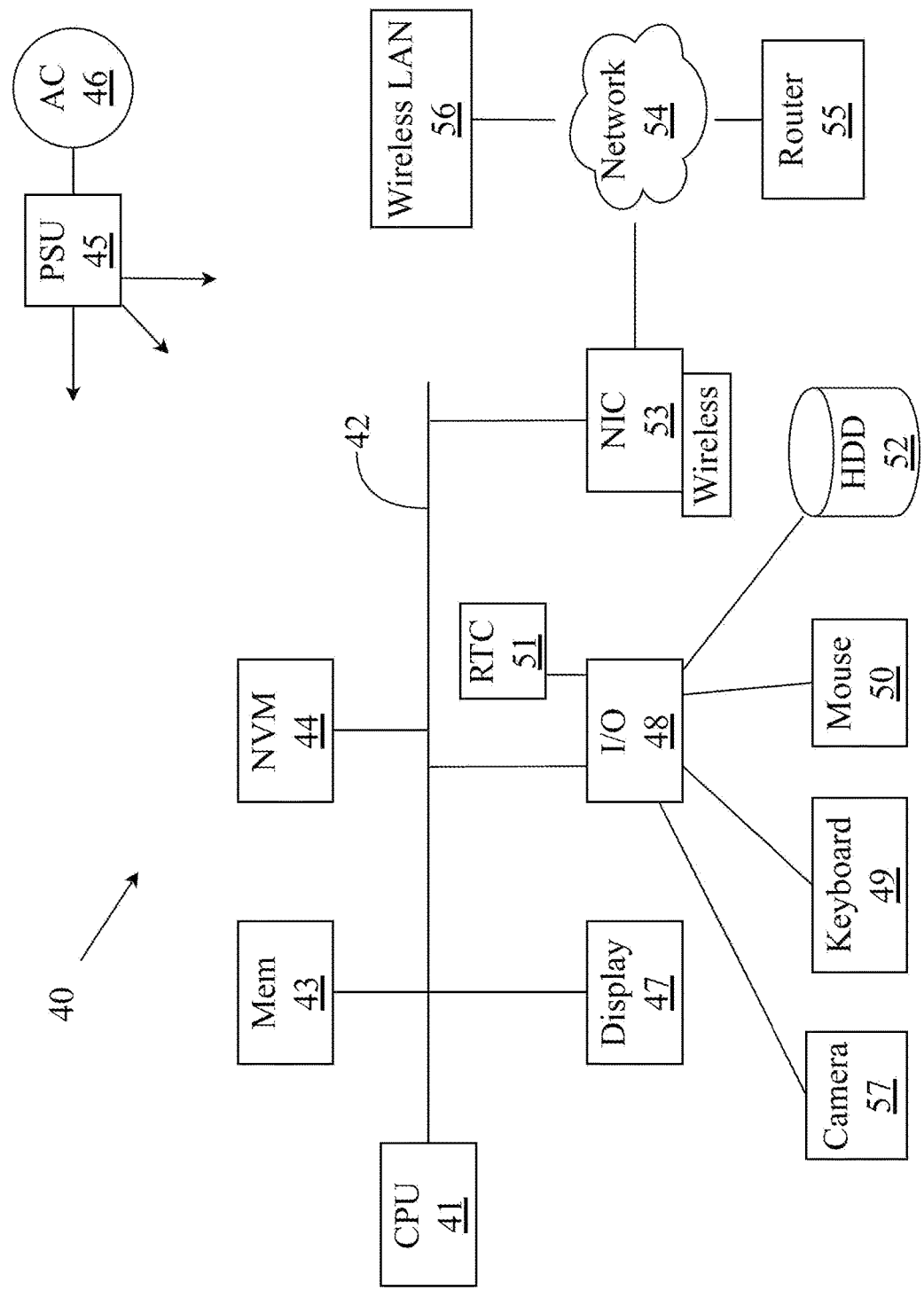
FIG. 23 is another block diagram illustrating an exemplary hardware architecture of a computing device.

FIG. 23 shows an exemplary overview of a computer system 2340 as may be used in any of the various locations throughout the system. It is exemplary of any computer that may execute code to process data. Various modifications and changes may be made to computer system 2340 without departing from the broader scope of the system and method disclosed herein. Central processor unit (CPU) 2341 is connected to bus 2342, to which bus is also connected memory 2343, nonvolatile memory 2344, display 2347, input/output (I/O) unit 2348, and network interface card (NIC) 2353. I/O unit 2348 may, typically, be connected to keyboard 2349, pointing device 2350, hard disk 2352, and real-time clock 2351. MC 2353 connects to network 2354, which may be the Internet or a local network, which local network may or may not have connections to the Internet. Also shown as part of system 2340 is power supply unit 2345 connected, in this example, to a main alternating current (AC) supply 2346. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods may be distributed among any number of client and/or server components. For example, various software modules may be implemented for performing various functions in connection with the various embodiments, and such modules may be variously implemented to run on server and/or client components.

The skilled person will be aware of a range of possible modifications of the various embodiments described above. Accordingly, the present invention is defined by the claims and their equivalents for universal identification and passport management using a phone identifier and text redirect.

What is claimed is:
1. A system for universal identification and passport management, comprising:
a computing device comprising a memory, a processor, and a non-volatile data storage device;
a first database stored on the non-volatile data storage device, the first database comprising a second plurality of user data, wherein the second plurality of user data includes a plurality of user privileges data and a plurality of user identity profiles comprising a plurality of user data, wherein the plurality of user data includes at least each user's phone number and device international mobile equipment identity (IMEI);
a second database stored on the non-volatile data storage device, the second database comprising a plurality of client instructions for authenticating a user computing device on a third-party client system, each client instruction of the plurality of client instructions comprising a scheme for generating placement of call-to-action elements and a verification procedure;
a positioning manager comprising a first plurality of programming instructions stored in the memory which, when operating on the processor, causes the computing device to:
retrieve from the second database a client instruction for authenticating a user computing device;
generate a call-to-action element comprising coding instructions configured to generate a pre-filled short message service (SMS) or multi-media message service (MMS) message comprising a destination, an identifier, and an IMEI on user computing devices, such that interaction with the call-to-action element on a user computing device causes the user computing device to propagate the pre-filled SMS or MMS message; and
place the call-to-action element according to the scheme specified in the client instructions; and
an identification and passport manager comprising a second plurality of programming instructions stored in the memory which, when operating on the processor, causes the computing device to:
receive the SMS or MMS message from the user computing device via the destination;
capture a phone number from which the SMS or MMS message was sent;
retrieve from the second database a client instruction for authenticating the user computing device using the identifier; and
execute the client instruction, wherein the client instruction causes the computing device to:
query the first database using the phone number and IMEI of the user computing device;
verify, using the query results, that a user identity profile associated with the phone number and IMEI satisfies the verification procedure of the client instruction; and
send a notification to the third-party client system.
2. The system of claim 1, wherein the identification and passport manager is further configured to:
on a first identification to the third-party client system, issue new privileges according to a new user procedure of the client instruction;
send user data from the user identity profile to the third-party client system;
update user privileges to the third-party client system; and
store the updated user privileges in the user identity profile.
3. The system of claim 1, wherein:
the system further comprises a session manager comprising a third plurality of programming instructions store in the memory which, when operating on the processor, causes the computing device to:

generate an authenticated session between the third-party client system and user computing device;
monitor and log user activity during the authenticated session; and
terminate the session.

4. The system of claim 1, wherein the call-to-action element comprises an interactable button or link, an NFC beacon, or a scannable QR code.

5. The system of claim 1, wherein the SMS or MMS message further comprises user consent to receive communications from the third-party client system.

6. The system of claim 1, wherein the identification and passport manager is further configured to send a notification to the user computing device.

7. The system of claim 2, wherein the identification and passport manager may further increase, decrease, or remove user privileges to the third-party client system.

8. The system of claim 3, wherein the session manager is further configured to:
send a SMS or MMS message to the user computing device comprising a request to extend or terminate the session or a warning of session expiration; and
receive a response to the SMS or MMS message to the user computing device from the user computing device via the destination;
update user privileges to the third-party client system;
store the updated user privileges in the user identity profile; and
send a notification to the third-party client system.

9. The system of claim 1, wherein the notification to the third-party client system further comprises a photograph.

10. The system of claim 6, wherein the identification and passport manager further comprises instructions to perform facial recognition on the photograph.

11. A method for universal identification and passport management, comprising the steps of:
creating a first database on the non-volatile data storage device of a computing device, the computing device comprising a memory, a processor, and the non-volatile data storage device, the first database comprising a second plurality of user data, wherein the second plurality of user data includes a plurality of user privileges data and a plurality of user identity profiles comprising a plurality of user data, wherein the plurality of user data includes at least each user's phone number and device international mobile equipment identity (IMEI);
creating a second database on the non-volatile data storage device of a computing device, the computing device comprising a memory, a processor, and the non-volatile data storage device, the second database comprising a plurality of client instructions for authenticating a user computing device on a third-party client system, each client instruction of the plurality of client instructions comprising a scheme for generating placement of call-to-action elements and a verification procedure;
using a positioning manager operating on the computing device to perform the steps of:
retrieving from the second database a client instruction for authenticating a user computing device;
generating a call-to-action element comprising coding instructions configured to generate a pre-filled short message service (SMS) or multi-media message service (MMS) message comprising a destination, an identifier, and an IMEI on user computing devices, such that interaction with the call-to-action element on a user computing device causes the user computing device to propagate the pre-filled SMS or MMS message;
placing the call-to-action element according to the scheme specified in the client instructions;
using an identification and passport manager operating on the computing device to perform the steps of:
retrieving from the second database a client instruction for authenticating a user computing device;
receiving the SMS or MMS message from the user computing device via the destination;
capturing a phone number from which the SMS or MMS message was sent;
retrieving from the second database a client instruction for authenticating the user computing device using the identifier;
executing the client instruction, wherein the client instruction causes the computing device to:
querying the first database using the phone number and IMEI of the user computing device;
verifying, using the query results, that a user identity profile associated with the phone number and IMEI satisfies the verification procedure of the client instruction; and
sending a notification to the third-party client system.

12. The method of claim 11, wherein the identification and passport manager is further configured to perform the steps of:
on a first identification to the third-party client system, issuing new privileges according to a new user procedure of the client instruction;
sending user data from the user identity profile to the third-party client system;
updating user privileges to the third-party client system; and
storing the updated user privileges in the user identity profile.

13. The method of claim 11, wherein the method further comprises the step of using a session manager operating on the computing device to perform the steps of:
generating an authenticated session between the third-party client system and user computing device;
monitoring and logging user activity during the authenticated session; and
terminating the session.

14. The method of claim 11, wherein the call-to-action element comprises an interactable button or link, an NFC beacon, or a scannable QR code.

15. The method of claim 11, wherein the SMS or MMS message further comprises user consent to receive communications from the third-party client system.

16. The method of claim 11, wherein the identification and passport manager further performs the step of sending a notification to the user computing device.

17. The method of claim 11, wherein the method further comprises the step of using the identification and passport manager to perform the steps of increasing, decreasing, or removing user privileges to the third-party client system.

18. The method of claim 13, wherein the method further comprises the step of using a session manager operating on the computing device to perform the steps of:
sending a SMS or MMS message to the user computing device comprising a request to extend or terminate the session or a warning of session expiration; and receiving a response to the SMS or MMS message to the user computing device from the user computing device via the destination;
updating user privileges to the third-party client system;
storing the updated user privileges in the user identity profile; and
sending a notification to the third-party client system.

19. The method of claim 11, wherein the notification to the third-party client system further comprises a photograph.

20. The method of claim 19, wherein the method further comprises the step of using the identification and passport manager to perform the step of performing facial recognition on the photograph.

* * * * *